(12) United States Patent
Kono et al.

(10) Patent No.: US 12,456,872 B2
(45) Date of Patent: Oct. 28, 2025

(54) POWER STORAGE APPARATUS AND POWER SYSTEM STABILIZATION SYSTEM

(71) Applicant: Mitsubishi Electric Corporation, Tokyo (JP)

(72) Inventors: Yoshiyuki Kono, Tokyo (JP); Shuhei Fujiwara, Tokyo (JP); Kazuyori Tahata, Tokyo (JP); Frederick Page, Tokyo (JP); Shinji Tominaga, Tokyo (JP); Masatoshi Takeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 18/251,613

(22) PCT Filed: Nov. 11, 2020

(86) PCT No.: PCT/JP2020/042122
§ 371 (c)(1),
(2) Date: May 3, 2023

(87) PCT Pub. No.: WO2022/102025
PCT Pub. Date: May 19, 2022

(65) Prior Publication Data
US 2024/0014669 A1 Jan. 11, 2024

(51) Int. Cl.
*H02J 7/06* (2006.01)
*H02J 7/00* (2006.01)
*H02J 7/34* (2006.01)

(52) U.S. Cl.
CPC .......... *H02J 7/0024* (2013.01); *H02J 7/0016* (2013.01); *H02J 7/06* (2013.01); *H02J 7/345* (2013.01);
(Continued)

(58) Field of Classification Search
None
See application file for complete search history.

(56) References Cited

U.S. PATENT DOCUMENTS

| | | | |
|---|---|---|---|
| 2010/0118578 A1 | 5/2010 | Dommaschk et al. | |
| 2012/0235511 A1* | 9/2012 | Watson | H02J 7/0048 307/109 |

(Continued)

FOREIGN PATENT DOCUMENTS

| | | |
|---|---|---|
| EP | 3926812 A1 | 12/2021 |
| JP | 2001197660 A | 7/2001 |

(Continued)

OTHER PUBLICATIONS

Extended European Search Report dated Dec. 19, 2023, issued in the corresponding European Patent Application No. 20961553.3, 7 pages.

(Continued)

*Primary Examiner* — Daniel Kessie
(74) *Attorney, Agent, or Firm* — Buchanan Ingersoll & Rooney PC

(57) ABSTRACT

A power storage apparatus of one embodiment includes a storage bank including a plurality of power storage elements connected to each other; and one or plurality of first cells. The storage bank and the one or plurality of first cells are connected in series to each other. Each first cell includes a pair of input/output nodes, a bridge circuit including at least two semiconductor switching elements, and a power storage element connected to the pair of input/output nodes via the bridge circuit. A storage capacity of the power storage element of each first cell is smaller than a storage capacity of the storage bank.

11 Claims, 20 Drawing Sheets

(52) U.S. Cl.
CPC ......... *H02J 7/0048* (2020.01); *H02J 2207/50* (2020.01)

(56) References Cited

U.S. PATENT DOCUMENTS

| | | | |
|---|---|---|---|
| 2018/0041028 A1* | 2/2018 | Wilhide | .................. H02M 3/04 |
| 2018/0054136 A1 | 2/2018 | Jimichi et al. | |
| 2018/0062514 A1* | 3/2018 | Dong | .................... H02M 3/158 |
| 2021/0091661 A1* | 3/2021 | Kono | .................. H02M 7/4835 |
| 2021/0344204 A1 | 11/2021 | Mochizuki | |

FOREIGN PATENT DOCUMENTS

| | | | |
|---|---|---|---|
| JP | 2001211549 A | 8/2001 | |
| JP | 2008178215 A | 7/2008 | |
| JP | 5189105 B2 | 4/2013 | |
| JP | 2020043653 A | 3/2020 | |
| JP | 6685477 B1 | 4/2020 | |
| WO | 2016152366 A1 | 9/2016 | |

OTHER PUBLICATIONS

Ishihashi et al., "Circuit Topology and Control Scheme of a High-Power High-Voltage DC/DC Converter for Large Scale Offshore Wind Project with DC Collector Grids", IEEJ Transactions on Industry Applications, vol. 138, No. 1, pp. 58-66, 2018.

Spahic et al., "Frequency Stability in Case of Interconnectors (AC and DC) and the Impact of Frequency Stabilizer", CIGRE Winnipeg 2017 Colloquium, B4-56, Sep. 2017.

International Search Report (PCT/ISA/210) with translation and Written Opinion (PCT/ISA/237) mailed on Dec. 22, 2020, by the Japan Patent Office as the International Searching Authority for International Application No. PCT/JP2020/042122. (8 pages).

* cited by examiner

FIG.1
(A)
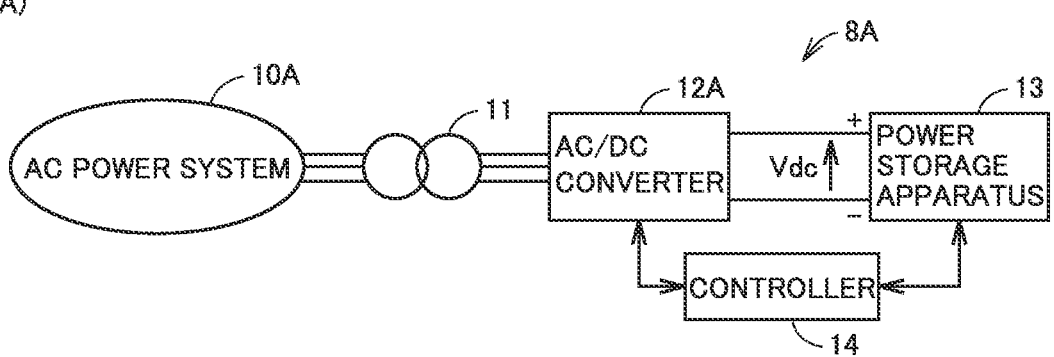
(B)
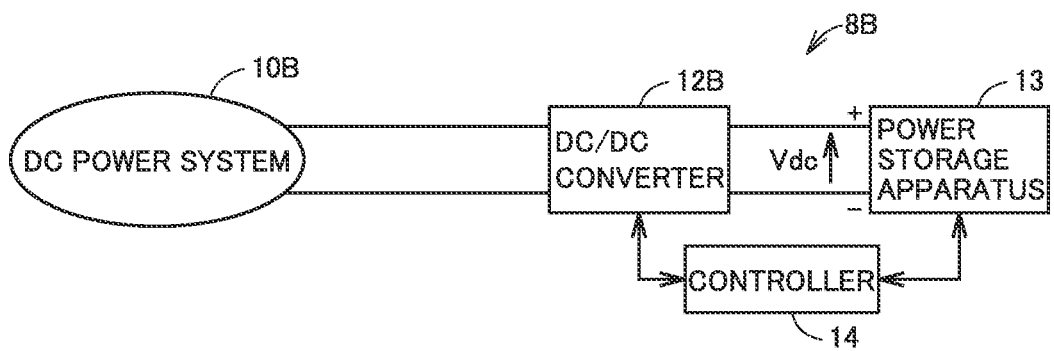

FIG.4
(A)
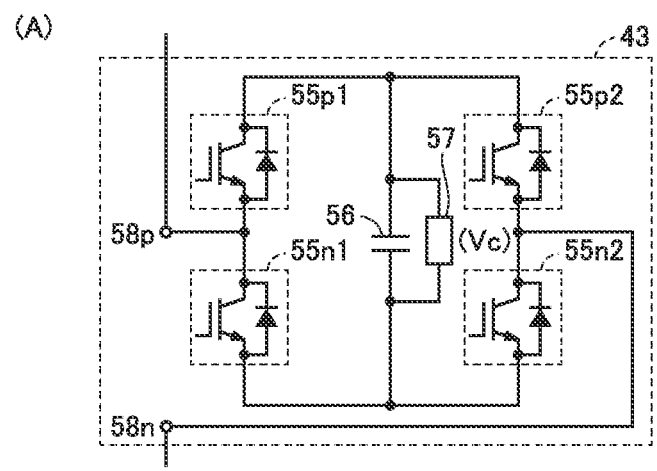
(B)
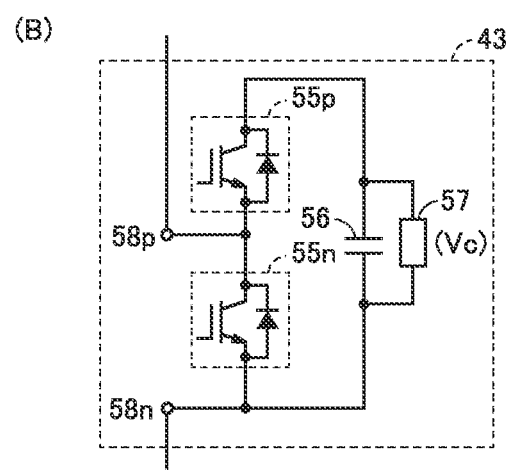

FIG.5
(A)
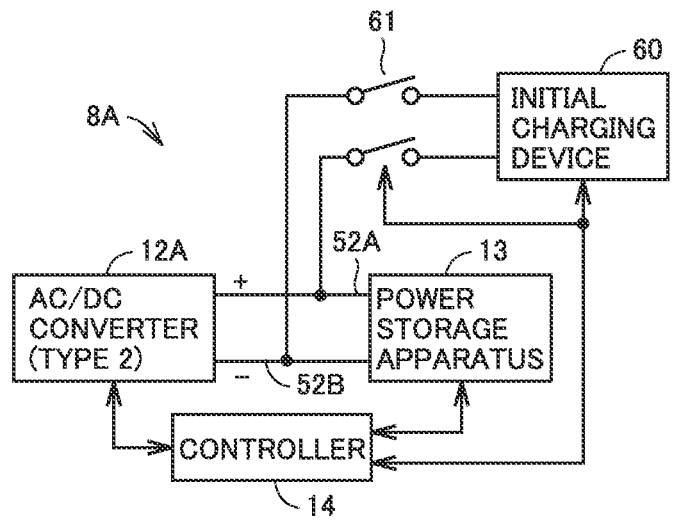
(B)
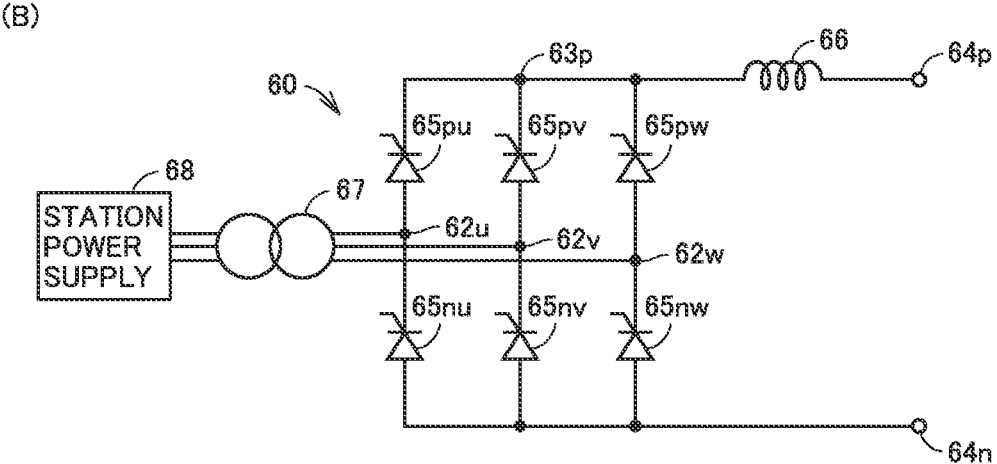
(C)
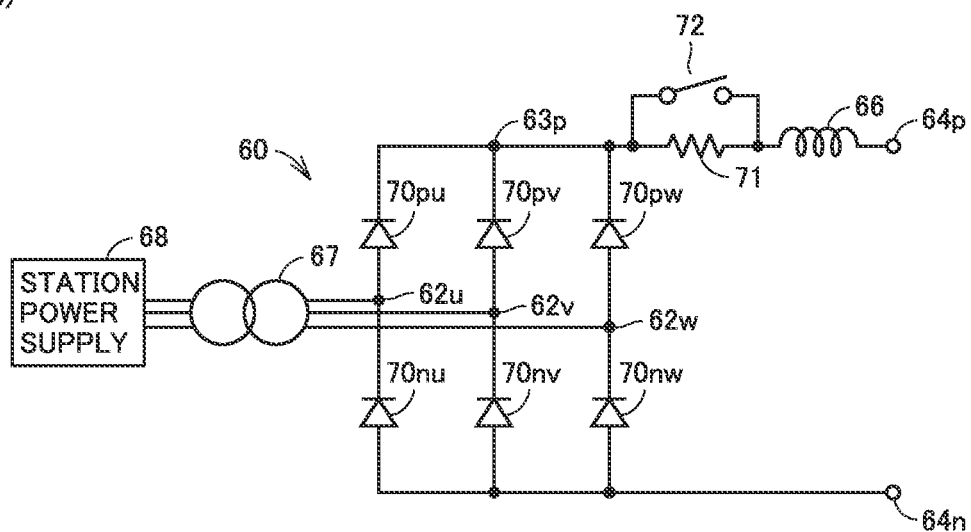

FIG.7
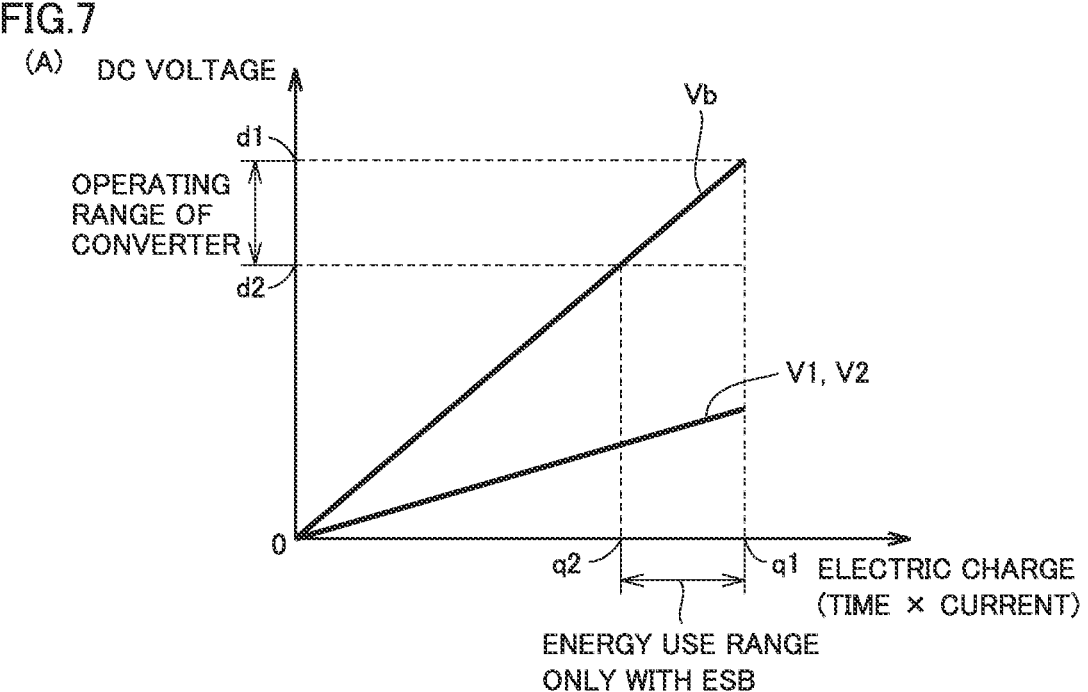
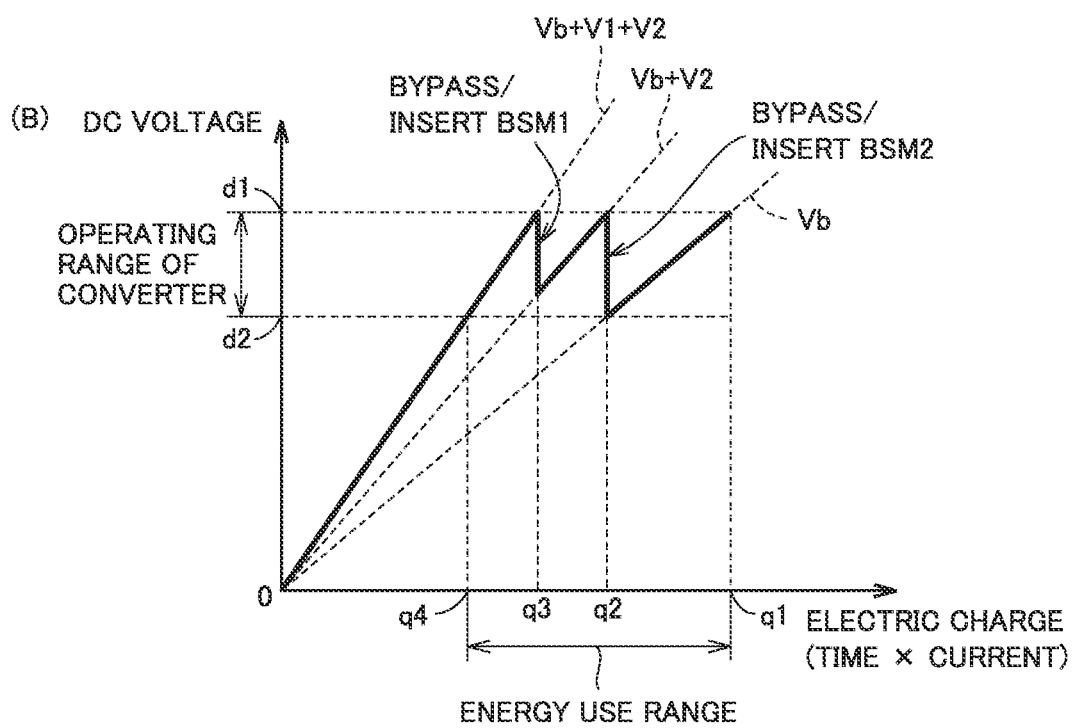

FIG.11
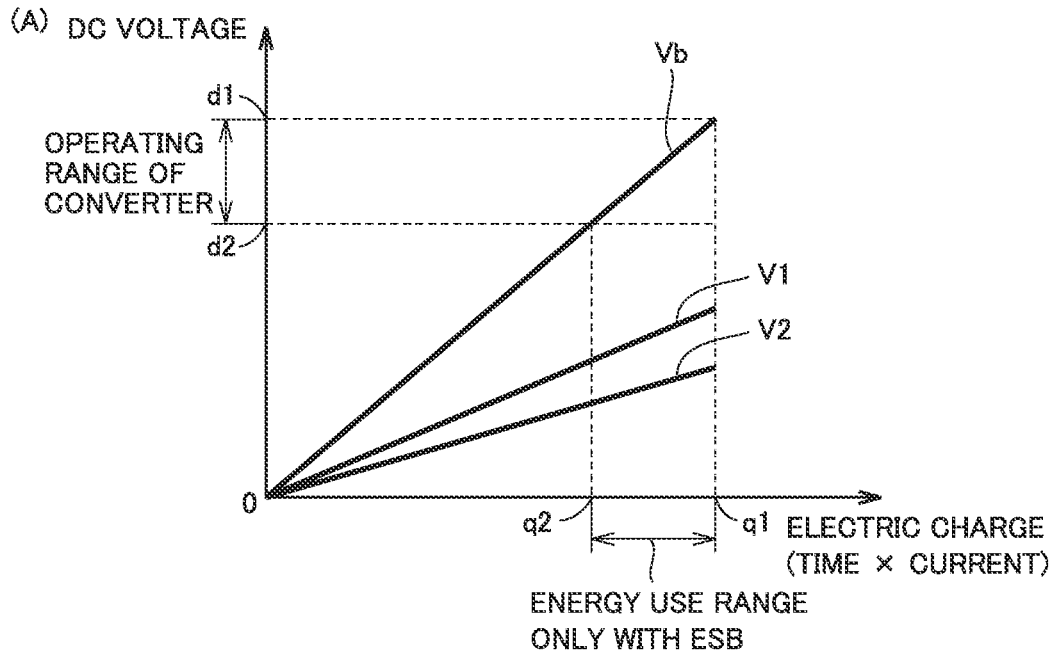
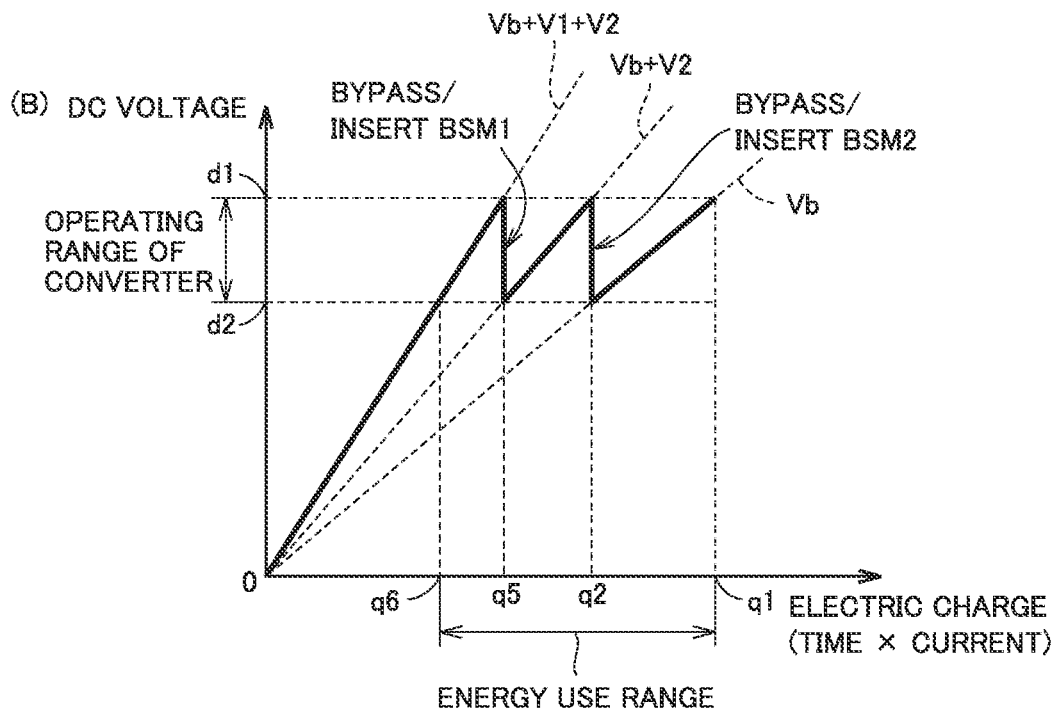

FIG.20
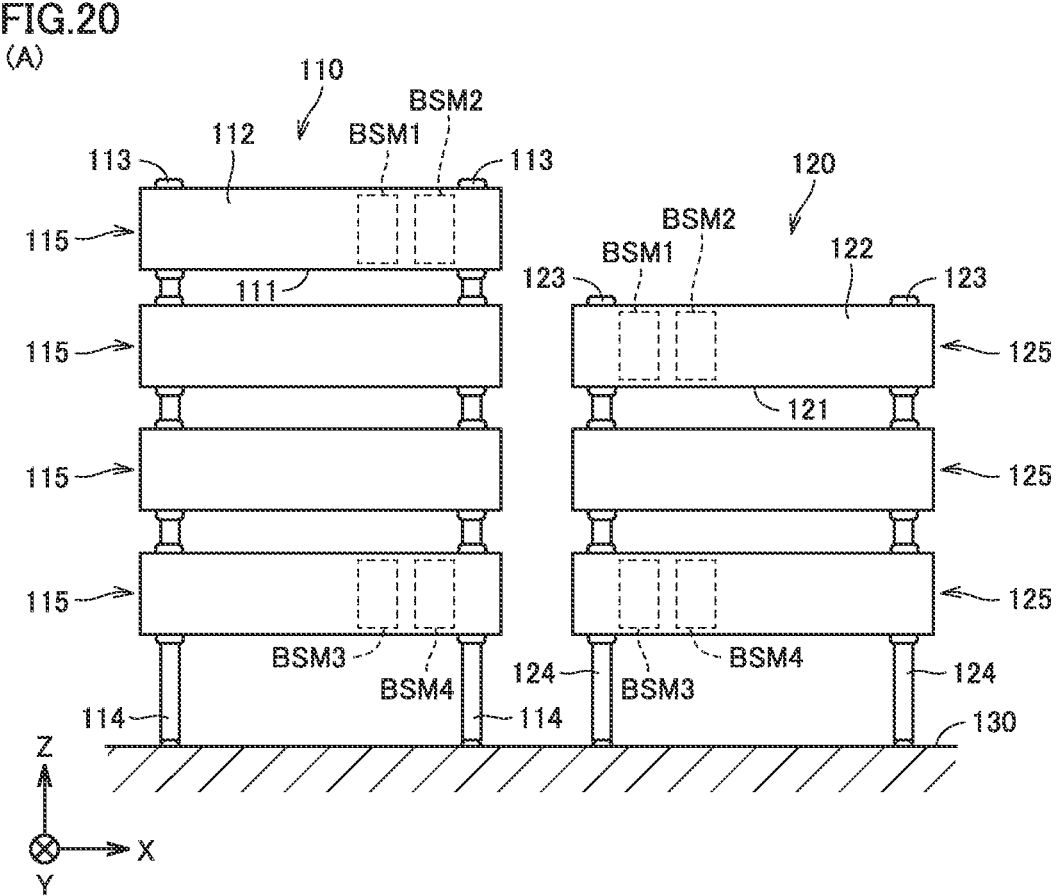
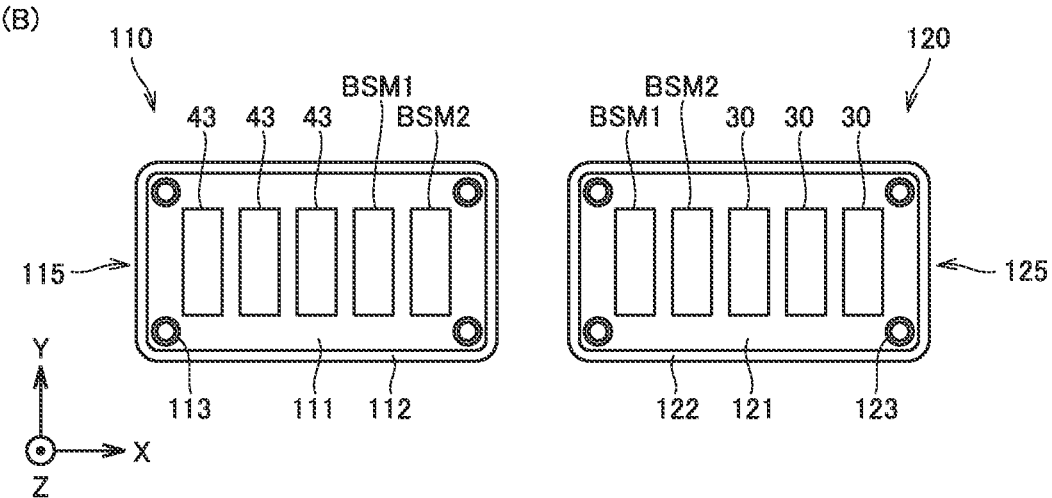

POWER STORAGE APPARATUS AND POWER SYSTEM STABILIZATION SYSTEM

TECHNICAL FIELD

The present disclosure relates to a power storage apparatus and a power system stabilization system.

BACKGROUND ART

A frequency stabilizer (FS) including a large-capacity capacitor called a supercapacitor is known. The supercapacitor is also referred to as an electrical double-layer capacitor (EDLC) or an ultracapacitor. In a frequency stabilizer of this type, discharge energy of a large-capacity capacitor provided on a DC side is converted into AC power by a self-excited converter, and is then released to an AC power system. Conversely, AC power of the power system is converted into DC power by the self-excited converter, and then the DC power is absorbed into the large-capacity capacitor as charge energy.

In addition, a battery interconnection facility called a battery energy storage system (BESS) can also realize a function similar to that of a facility including the above-described supercapacitor. That is, the discharge energy of the storage battery on the DC side is discharged to the AC power system via the self-excited converter, and conversely, the AC power of the AC power system is absorbed into the storage battery as charge energy via the self-excited converter.

As described above, by interconnection of the energy storage element on the DC side to the AC power system via the self-excited converter, the stored DC energy can be utilized for frequency stabilization and load leveling of the power system, and can be further utilized as reserve power (backup).

PTL 1 (Japanese Patent Laying-Open No. 2001-197660) discloses an example of a system stabilization system including a capacitor power storage apparatus including a plurality of capacitors. In the capacitor power storage apparatus of this document, the plurality of capacitors can be connected in series or some of the plurality of capacitors can be connected in parallel by switching a plurality of switches.

PTL 2 (Japanese Patent Laying-Open No. 2020-43653) discloses an example of a power storage apparatus including a storage battery. The power storage apparatus of this document includes a plurality of energy storage units connected in series. Each of the energy storage units includes a charge switch connected in series with an electric condenser between charge and discharge terminals, and a bypass switch bypassing between the charge and discharge terminals.

The following introduces documents of conventional techniques that are related to a part of the present disclosure.

PTL 3 (Japanese Patent No. 5189105) and NPL 1 (E. Spahic et al., CIGRE Winnipeg 2017 Colloquium, B4-56, September 2017) disclose configuration examples of a modular multilevel converter (MMC) which is an example of a self-excited AC/DC converter. The former is the case where each converter cell takes a half-bridge configuration, and the latter is the case where each converter cell takes a full-bridge configuration.

PTL 4 (WO 2016/152366 A) and NPL 2 (Ishihashi et al., Journal of the Institute of Electrical Engineers of Japan D (Journal of Industrial Applications), Vol. 138(1), pp. 58-66, 2018) disclose configuration examples of a self-excited DC/DC converter.

PTL 5 (Japanese Patent Laying-Open No. 2008-178215) discloses a frequency adjustment system including a power consumption means having a variable resistor instead of a charge/discharge means configured by a secondary battery or the like.

CITATION LIST

Patent Literature

PTL 1: Japanese Patent Laying-Open No. 2001-197660
PTL 2: Japanese Patent Laying-Open No. 2020-43653
PTL 3: Japanese Patent No. 5189105
PTL 4: WO 2016/152366 A
PTL 5: Japanese Patent Laying-Open No. 2008-178215

Non Patent Literature

NPL 1: E. Spahic et al., "Frequency Stability in Case of Interconnectors (AC and DC) and the Impact of Frequency Stabilizer", CIGRE Winnipeg 2017 Colloquium, B4-56, September 2017

NPL 2: Ishihashi et al., "Circuit Topology and Control Scheme of a High-Power High-Voltage DC/DC Converter for Large Scale Offshore Wind Project with DC Collector Grids", IEEJ Transactions on Industry Applications, Vol. 138, No. 1, pp. 58-66, 2018

SUMMARY OF INVENTION

Technical Problem

An energy storage element used in the power system stabilization system has a problem that DC voltages that are input and output varies according to a state of charge (SOC). Therefore, when variation of the input/output voltages is suppressed to be small, a variation range of the SOC of the energy storage element is limited.

In PTL 1 (Japanese Patent Application Laid-Open No. 2001-197660) and PTL 2 (Japanese Patent Application Laid-Open No. 2020-43653), a variation range of voltages can be reduced by switching the switch, but there is a disadvantage that the number of switches is increased.

The present disclosure has been made in view of the above problems, and an object in one aspect of the present disclosure is to provide a power storage apparatus capable of suppressing variations in input/output voltages and currents even when a variation range of the SOC is widened.

Solution to Problem

A power storage apparatus according to one embodiment includes: a storage bank including a plurality of power storage elements connected to each other; and one or a plurality of first cells. The storage bank and the one or plurality of first cells are connected in series to each other. The one first cell or each of the plurality of first cells includes: a pair of input/output nodes; a bridge circuit including at least two semiconductor switching elements; and a power storage element connected to the pair of input/output nodes via the bridge circuit. A storage capacity of the power storage element of the one first cell or a storage capacity of the power storage element of each of the plurality of first cells is smaller than a storage capacity of the storage bank.

Advantageous Effects of Invention

According to the power storage apparatus of the above embodiment, by providing one or a plurality of first cells connected in series to the storage bank, it is possible to suppress variations in input/output voltages and currents even when a variation range of the SOC is widened.

BRIEF DESCRIPTION OF DRAWINGS

FIG. 1 is a block diagram illustrating a schematic configuration of a power system stabilization system.

FIG. 4 is a circuit diagram illustrating a configuration example of converter cells 43 constituting the self-commutated AC/DC converter illustrated in FIG. 3.

FIG. 5 is a view for illustrating initial charging of the power storage apparatus.

FIG. 7 is a diagram showing a relationship between an amount of electric charge and a DC voltage in the power storage apparatus including a capacitor.

FIG. 11 is a view showing a relationship between an amount of electric charge and a DC voltage in the power storage apparatus according to a second embodiment.

FIG. 20 shows a side view and a plan view illustrating an implementation example corresponding to the circuit diagram of FIG. 19.

DESCRIPTION OF EMBODIMENTS

Figure 2:
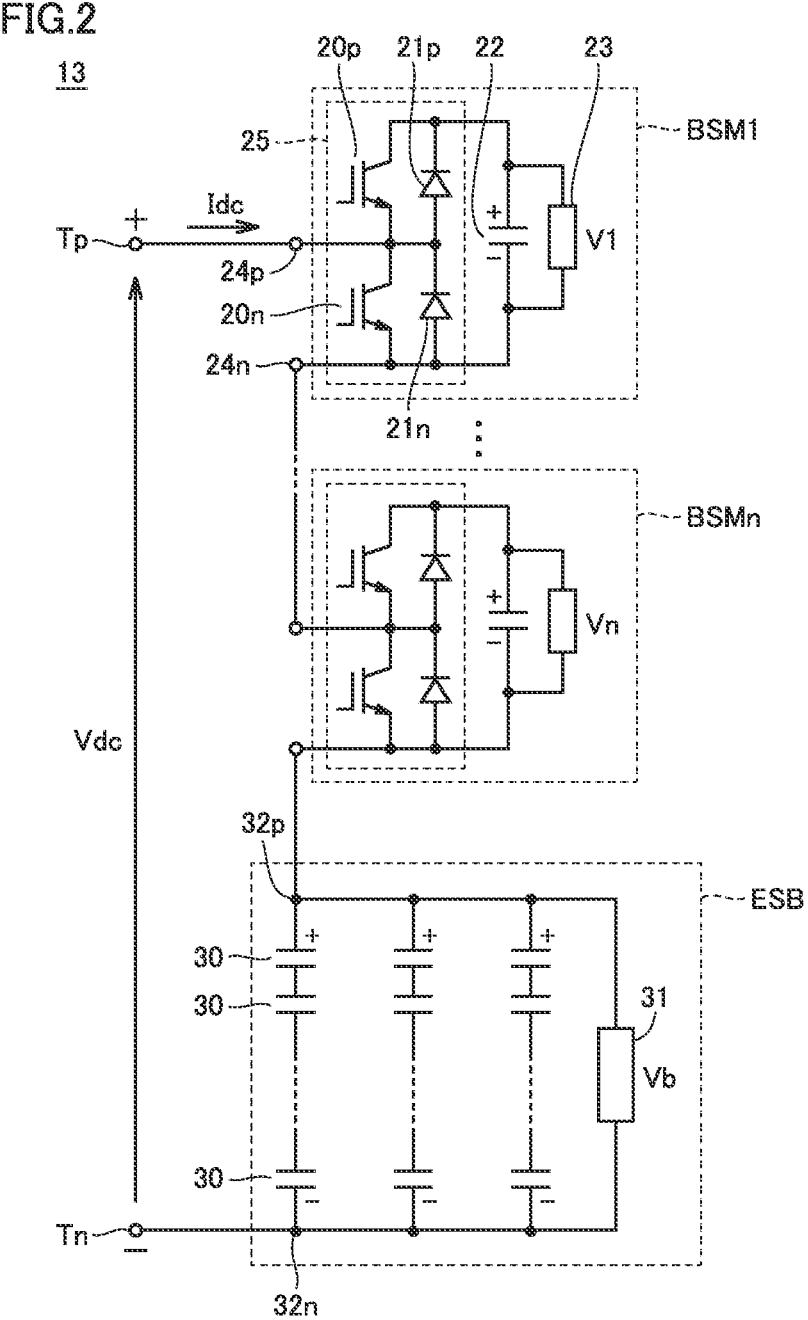
FIG. 2 is a circuit diagram showing a schematic configuration of a power storage apparatus of FIG. 1.

Hereinafter, embodiments will be described in detail with reference to the drawings. The same or corresponding parts are denoted by the same reference numerals, and descriptions thereof will not be repeated.

First Embodiment

[Schematic Configuration of Power System Stabilization System]

FIG. 1 is a block diagram showing a schematic configuration of a power system stabilization system. FIG. 1(A) illustrates a configuration example of a power system stabilization system 8A connected to an AC power system 10A, and FIG. 1(B) illustrates a configuration example of a power system stabilization system 8B connected to a DC power system 10B.

Referring to FIG. 1(A), power system stabilization system 8A includes a transformer 11, an AC/DC converter 12A, a power storage apparatus 13, and a controller 14.

AC/DC converter 12A is connected between AC power system 10A and power storage apparatus 13, and performs forward conversion for converting AC into DC and inverse conversion for converting DC into AC. More specifically, AC/DC converter 12A converts AC power of AC power system 10A into DC power, and causes power storage apparatus 13 to absorb the DC power as charge energy. Conversely, AC/DC converter 12A converts discharge energy of power storage apparatus 13 into AC power, and releases the AC power to AC power system 10A.

AC/DC converter 12A may be of a 2 level/3 level multi-level method, an MMC method, a transformer multiplexing method, a reactor parallel method, or a combination of any of the above. A more detailed configuration example of AC/DC converter 12A of the MMC method will be described later with reference to FIGS. 3 and 4. In the present disclosure, AC/DC converter 12A is also referred to as a power converter 12A.

Transformer 11 is connected between AC power system 10A and AC/DC converter 12A. An interconnection reactor may be used instead of transformer 11.

Power storage apparatus 13 charges and discharges DC energy. The energy accumulated in power storage apparatus 13 is utilized for frequency stabilization and load leveling of the power system, and further utilized as reserve power (backup). A more detailed configuration of power storage apparatus 13 will be described later with reference to FIG. 2.

Controller 14 controls operations of AC/DC converter 12A and power storage apparatus 13 based on detected values of a current and a voltage. An example of a hardware configuration of controller 14 will be described later with reference to FIG. 6. Controller 14 may be included in either power storage apparatus 13 or AC/DC converter 12A.

Next, referring to FIG. 1(B), power system stabilization system 8B includes a DC/DC converter 12B, power storage apparatus 13, and controller 14.

DC/DC converter 12B is connected between DC power system 10B and power storage apparatus 13, and performs level conversion of a DC voltage. More specifically, DC/DC converter 12B converts a voltage level of the DC voltage of DC power system 10B, and charges power storage apparatus 13 by supplying the DC voltage after the level conversion to power storage apparatus 13. Conversely, DC/DC converter 12B converts the voltage level of the DC voltage discharged from power storage apparatus 13, and outputs the DC voltage after the level conversion to DC power system 10B.

As DC/DC converter 12B, an insulated DC-AC-DC converter as disclosed in PTL 4 (WO 2016/152366 A) and NPL 2 (Ishihashi et al., IEEJ Transactions on Industry Applications, Vol. 138, No. 1, pp. 58-66, 2018) is generally used. Instead, DC/DC converter 12B may be a non-insulating chopper type converter or a combination of the above. In the present disclosure, DC/DC converter 12B is also referred to as a power converter 12B.

Power storage apparatus 13 and controller 14 in FIG. 1(B) are substantially the same as power storage apparatuses 13 and 14 in FIG. 1(A), and thus, the description thereof will not be repeated.

[Configuration Example of Power Storage Apparatus]

FIG. 2 is a circuit diagram showing a schematic configuration of the power storage apparatus of FIG. 1. Referring to FIG. 2, power storage apparatus 13 includes a storage bank ESB and one or more (n) submodules BSM1 to BSMn connected in series to each other. In the present disclosure, submodules BSM1 to BSMn are also referred to as booster cells BSM1 to BSMn or first cells BSM1 to BSMn.

Storage bank ESB and one or more booster cells BSM1 to BSMn are connected in series between a positive electrode terminal Tp and a negative electrode terminal Tn of power storage apparatus 13. Storage bank ESB and the plurality of booster cells BSM1 to BSMn may be arranged in any order. Hereinafter, in a case where booster cells BSM1 to BSMn are collectively referred to or one of them is indicated, booster cells BSM1 to BSMn are referred to as booster cell BSM.

Storage bank ESB includes a plurality of power storage elements 30 connected in series and in parallel between a positive electrode node 32p and a negative electrode node 32n. Power storage elements 30 may be supercapacitors or storage batteries, and are not particularly limited as long as it is capable of storing charges. Storage bank ESB further includes a voltage detector 31 to detect a DC voltage Vb between positive electrode node 32p and negative electrode node 32n. Storage bank ESB is not configured such that the connection of individual power storage elements 30 can be switched by a switch.

Each of booster cells BSM has a circuit configuration referred to as a half-bridge configuration in the example of FIG. 2. Specifically, booster cell BSM includes a series combination configured by connecting two switching elements 20p and 20n in series, diodes 21p and 21n, a power storage element 22, a voltage detector 23, and input/output nodes 24p and 24n. The series combination of switching elements 20p and 20n and power storage element 22 are connected in parallel. Diodes 21p and 21n are respectively connected in anti-parallel to switching elements 20p and 20n. Voltage detector 23 detects a voltage V (V1 to Vn) across both ends of power storage element 22.

Power storage element 22 may be a supercapacitor or a storage battery, and is not particularly limited as long as it is capable of storing charges. A storage capacity of power storage element 22 of each booster cell BSM is smaller than a storage capacity of storage bank ESB. Here, the storage capacity refers to a charge amount (that is, current×time) required for charging to a rated voltage.

As switching elements 20p and 20n, for example, a self-arc-extinguishing semiconductor switching element such as an insulated gate bipolar transistor (IGBT) or a gate commutated turn-off (GCT) thyristor is used. Hereinafter, switching elements 20p and 20n will be referred to as a switching element 20 in a case where the switching elements are collectively referred to or one of the switching elements is referred to.

Both terminals of switching element 20n of each booster cell BSM are connected to input/output nodes 24p and 24n, respectively. By a switching operation of switching elements 20p and 20n, it is possible to switch between an insertion state in which power storage element 22 is inserted between input/output nodes 24p and 24n and a bypass state in which input/output nodes 24p and 24n are short-circuited. That is, when switching element 20p is turned on and switching element 20n is turned off, power storage element 22 is connected between input/output nodes 24p and 24n. When switching element 20p is turned off and switching element 20n is turned on, input/output nodes 24p and 24n are in the bypass state coupled via switching element 20n. In the bypass state, the positive electrode terminal of power storage element 22 is separated from input/output node 24p.

As shown in FIG. 2, each booster cell BSM is connected, via input/output node 24p or 24n, to adjacent booster cell BSM, adjacent storage bank ESB, positive electrode terminal Tp, or negative electrode terminal Tn. Storage bank ESB is connected, via positive electrode node 32p or negative electrode node 32n, to adjacent booster cell BSM, positive electrode terminal Tp, or negative electrode terminal Tn.

The configuration of each booster cell BSM may be a full-bridge configuration as illustrated in FIG. 4(A). Therefore, each booster cell BSM includes a bridge circuit 25 configured by at least two switching elements 20, power storage element 22, voltage detector 23, and input/output nodes 24p and 24n. Power storage element 22 is connected to input/output nodes 24p and 24n via bridge circuit 25.

[Configuration Example of AC/DC Converter]

Figure 3:
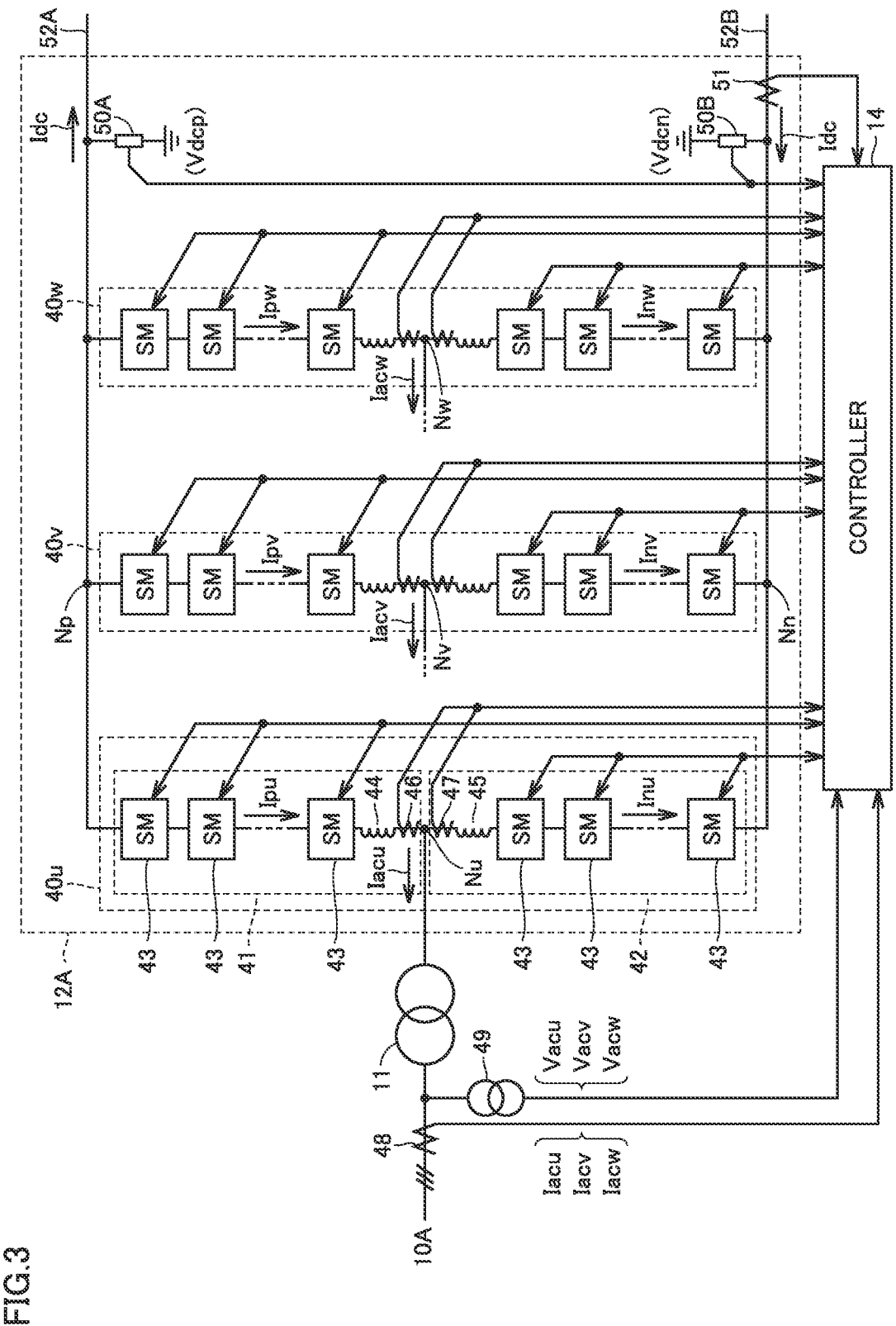
FIG. 3 is a diagram illustrating an example of a schematic configuration of hardware of the AC/DC converter in FIG. 1.

FIG. 3 is a diagram illustrating an example of a schematic configuration of hardware of the AC/DC converter of FIG. 1. FIG. 3 illustrates an example in which AC/DC converter 12A of FIG. 1 is configured by a modular multi-level converter.

Referring to FIG. 3, AC/DC converter 12A includes a plurality of converter cells 43 connected in series with each other. The "converter cell" is also called a "submodule" or a "unit converter". AC/DC converter 12A performs power conversion between a DC circuit (DC wirings 52A and 52B) and AC power system 10A.

AC/DC converter 12A includes a plurality of leg circuits 40u, 40v, and 40w (collectively or arbitrarily referred to as a leg circuit 40) connected in parallel with each other between a positive DC terminal (that is, the high-potential-side DC terminal) Np and a negative DC terminal (that is, the low-potential-side DC terminal) Nn.

Leg circuit 40 is provided in each of a plurality of phases constituting an alternating current. Leg circuit 40 is connected between AC power system 10A and DC wirings 52A and 52B, and performs power conversion between the AC system and the DC system. In FIG. 3, three leg circuits 40u, 40v, and 40w are provided corresponding to a U phase, a V phase, and a W phase, respectively.

AC input terminals Nu, Nv, and Nw provided respectively in leg circuits 40u, and 40w are connected to AC power system 10A via transformer 11. In FIG. 3, the connection between AC input terminals Nv and Nw and transformer 11 is not illustrated for ease of illustration.

High-potential-side DC terminal Np and low-potential-side DC terminal Nn commonly connected to each leg circuit 40 are connected to DC wiring 52A and DC wiring 52B, respectively.

Primary windings may be provided in leg circuits 40u, 40v, and 40w in place of AC input terminals Nu, Nv, and Nw in FIG. 3, and leg circuits 40u, 40v, and 40w may be connected to transformer 11 or an interconnection reactor in an AC manner via secondary windings magnetically coupled to the primary windings. In this case, the primary windings may be reactors 44 and 45 described below.

Leg circuit 40u includes an upper arm 41 from high-potential-side DC terminal Np to AC input terminal Nu and a lower arm 42 from low-potential-side DC terminal Nn to AC input terminal Nu. AC input terminal Nu, which is a connection point between upper arm 41 and lower arm 42, is connected to transformer 11. Since leg circuits 40v and 40w have similar configurations, the configuration of leg circuit 40u will be representatively described below.

Upper arm 41 includes the plurality of converter cells 43 that are cascaded and reactor 44. The plurality of converter cells 43 and reactor 44 are connected in series. Similarly, lower arm 42 includes the plurality of converter cells 43 that are cascaded and a reactor 45. The plurality of converter cells 43 and reactor 45 are connected in series. By providing reactors 44 and 45, it is possible to suppress a rapid increase in fault current in the event of a fault in AC power system 10A, DC wirings 52A and 52B, or the like.

AC/DC converter 12A further includes a voltage transformer 49, a current transformer 48, DC voltage detectors 50A and 50B, current transformers 46 and 47 provided in each leg circuit 40, and a DC current detector 51, as detectors to measure amounts of electricity (current, voltage, and the like) used for control. Signals detected by these detectors are input to controller 14.

Note that, in FIG. 3, for ease of illustration, a part of signal lines of signals input from the detectors to controller 14 and signal lines of signals input and output between controller 14 and converter cells 43 are collectively illustrated, but are actually provided respectively for the detectors and converter cells 43. The signal lines between converter cells 43 and controller 14 may be provided separately for transmission and for reception. The signal line is configured, for example, by an optical fiber.

Voltage transformer 49 detects a U-phase AC voltage Vacu, a V-phase AC voltage Vacv, and a W-phase AC voltage Vacw of AC power system 10A. Current transformer 48 detects a U-phase AC current Iacu, a V-phase AC current Iacv, and a W-phase AC current Iacw of AC power system 10A.

DC voltage detector 50A detects a DC voltage Vdcp of high-potential-side DC terminal Np connected to DC wiring 52A. DC voltage detector 50B detects a DC voltage Vdcn of the low-potential-side DC terminal Nn connected to DC wiring 52B. A difference between DC voltage Vdcp and DC voltage Vdcn is defined as a DC voltage Vdc. DC current detector 51 detects a DC current Idc flowing through high-potential-side DC terminal Np or low-potential-side DC terminal Nn.

Current transformers 46 and 47 provided in U-phase leg circuit 40u detect an upper arm current Ipu flowing through upper arm 41 and a lower arm current Inu flowing through lower arm 42, respectively. Current transformers 46 and 47 provided in V-phase leg circuit 40v detect an upper arm current Ipv and a lower arm current Inv, respectively. Current transformers 46 and 47 provided in W-phase leg circuit 40w detect an upper arm current Ipw and a lower arm current Inw, respectively.

[Configuration Example of Converter Cell]

FIG. 4 is a circuit diagram showing a configuration example of converter cells 43 constituting the self-commutated AC/DC converter illustrated in FIG. 3.

Converter cell 43 illustrated in FIG. 4(A) has a circuit configuration called the full-bridge configuration. Each of converter cells 43 includes a first series combination configured by connecting two switching elements 55p1 and 55n1 in series, a second series combination configured by connecting two switching elements 55p2 and 55n2 in series, a power storage element 56, a voltage detector 57, and input/output nodes 58p and 58n. The first series combination, the second series combination, and power storage element 56 are connected in parallel. Voltage detector 57 detects a voltage Vc across both ends of power storage element 56.

A midpoint of switching element 55p1 and switching element 55n1 is connected to input/output node 58p. Similarly, a midpoint of switching element 55p2 and switching element 55n2 is connected to input/output node 58n. Converter cell 43 outputs a voltage Vc or −Vc of power storage element 56, or 0 voltage between input/output nodes 58p and 58n by the switching operation of switching elements 55p1, 55p2, and 55n2.

Converter cell 43 illustrated in FIG. 4(B) has a circuit configuration called the half-bridge configuration. Converter cell 43 includes a series combination configured by connecting two switching elements 55p and 55n in series, power storage element 56, voltage detector 57, and input/output nodes 58p and 58n. The series combination of switching elements 55p and 55n and power storage element 56 are connected in parallel. Voltage detector 57 detects a voltage Vc across both ends of power storage element 56.

Both terminals of switching element 55n are connected to input/output nodes 58p and 58n, respectively. Converter cell 43 outputs voltage Vc of power storage element 56 or 0 voltage between input/output nodes 58p and 58n by the switching operation of switching elements 55p and 55n. When switching element 55p is turned on and switching element 55n is turned off, voltage Vc of power storage element 56 is output from converter cell 43. When switching element 55p is turned off and switching element 55n is turned on, converter cell 43 outputs 0 voltage.

In FIGS. 4(A) and 4(B), each of switching elements 55p, 55n, 55p1, 55n1, 55p2, and 55n2 is configured by connecting a freewheeling diode (FWD) in anti-parallel to a self-arc-extinguishing semiconductor switching element such as an IGBT or a GCT thyristor.

In FIGS. 4(A) and 4(B), a capacitor such as a film capacitor is mainly used for power storage element 56. Power storage element 56 may be referred to as a capacitor in the following description. Hereinafter, voltage Vc of power storage element 56 is also referred to as a capacitor voltage Vc.

As shown in FIG. 3, converter cells 43 are cascaded. In each of FIGS. 4(A) and 4(B), in converter cell 43 arranged in upper arm 41, input/output node 58p is connected to input/output node 58n of adjacent converter cell 43 or high-potential-side DC terminal Np, and input/output node 58n is connected to input/output node 58p of adjacent converter cell 43 or AC input terminal Nu. Similarly, in converter cell 43 arranged in lower arm 42, input/output node 58p is connected to input/output node 58n of adjacent converter cell 43 or AC input terminal Nu, and input/output node 58n is connected to input/output node 58p of adjacent converter cell 43 or low-potential-side DC terminal Nn.

A converter cell other than the configuration exemplified above, for example, a converter cell to which a circuit configuration called a clamped double cell or the like is applied may be used, and the switching element and the power storage element are not limited to the above examples.

[Initial Charging Device]

Examples of AC/DC converter 12A include a type that can adjust the DC voltage between 0V and the rated voltage (hereinafter referred to as type 1) and a type that can adjust the DC voltage in a limited voltage range around the rated voltage (hereinafter referred to as type 2). For example, an MMC constituted by converter cells 43 in the full-bridge configuration shown in FIG. 4(A) is AC/DC converter 12A of type 1. An MMC constituted by converter cells 43 in the half-bridge configuration shown in FIG. 4(B) is AC/DC converter 12A of type 2. In the case of the type-2 MMC, the range of the DC voltage is about 0.8 PU to 1 PU. Here, PU represents a per-unit system.

At the time of activation of power storage apparatus 13 (that is, when the SOC of power storage apparatus 13 is 0%), AC/DC converter 12A of type 1 can gradually change the DC voltage supplied to power storage apparatus 13 from 0V to the rated voltage by constant current charging.

On the other hand, in the case of AC/DC converter 12A of type 2, when the lower limit voltage (for example, 0.8 PU) is suddenly supplied to power storage apparatus 13 at the time of activation of power storage apparatus 13, a large current flows through power storage apparatus 13, which is undesirable. Therefore, it is necessary to separately prepare an initial charging device.

FIG. 5 is a view for showing initial charging of the power storage apparatus. FIG. 5(A) illustrates a configuration example of power system stabilization system 8A further including an initial charging device 60, and FIGS. 5(B) and 5(C) illustrate configuration examples of initial charging device 60.

Referring to FIG. 5(A), initial charging device 60 is connected to DC wirings 52A and 52B connecting AC/DC converter 12A of type 2 and power storage apparatus 13 via a switch 61. Controller 14 controls operations of initial charging device 60 and switch 61. Controller 14 causes power storage apparatus 13 to be charged to a lower limit voltage adjustable by AC/DC converter 12A using initial charging device 60 by turning switch 61 on at the start of charging of power storage apparatus 13. After power storage apparatus 13 is charged to the lower limit voltage, controller 14 turns switch 61 off, connects AC/DC converter 12A to power storage apparatus 13, and activates the AC/DC converter. Accordingly, power storage apparatus 13 is further charged by AC/DC converter 12A.

Referring to FIG. 5(B), initial charging device 60 can be configured using a thyristor rectifier. The thyristor rectifier includes U-phase thyristors 65$pu$ and 65$nu$, V-phase thyristors 65$pv$ and 65$nv$, and W-phase thyristors 65$pw$ and 65$nw$, which are connected between input/output terminals 64$p$ and 64$n$ of initial charging device 60. An AC voltage is supplied from a station power supply 68 via a transformer 67 to a connection node 62$u$ of thyristors 65$pu$ and 65$nu$ connected in series, a connection node 62$v$ of thyristors 65$pv$ and 65$nv$ connected in series, and a connection node 62$w$ of thyristors 65$pw$ and 65$nw$ connected in series. A common cathode side node 63$p$ of thyristors 65$pu$, 65$pv$, and 65$pw$ is connected to an input/output node 64$p$ on the positive side via a reactor 66. A common anode side node of thyristors 65$nu$, 65$nv$, and 65$nw$ is connected to an input/output node 64$n$ on the negative side.

Referring to FIG. 5(C), initial charging device 60 can be configured using a diode rectifier. The diode rectifier includes U-phase diodes 70$pu$ and 70$nu$, V-phase diodes 70$pv$ and 70$nv$, and W-phase diodes 70$pw$ and 70$nw$, which are connected between input/output terminals 64$p$ and 64$n$ of initial charging device 60. An AC voltage is supplied from station power supply 68 via transformer 67 to connection node 62$u$ of diodes 70$pu$ and 70$nu$ connected in series, connection node 62$v$ of diodes 70$pv$ and 70$nv$ connected in series, and connection node 62$w$ of diodes 70$pw$ and 70$nw$ connected in series. Common cathode side node 63$p$ of diodes 70$pu$, 70$pv$, and 70$pw$ is connected to input/output node 64$p$ on the positive side via a resistance element 71 for suppressing an inrush current and reactor 66. A common anode side node of diodes 70$nu$, 70$nv$, 70$nw$ is connected to input/output node 64$n$ on the negative side.

Resistance element 71 is provided with a bypass switch 72. Controller 14 controls bypass switch 72 to the off-state at the initial stage of charging to suppress an inrush current. Thereafter, controller 14 controls bypass switch 72 to be turned on.

As another configuration, initial charging device 60 can be replaced by replacing the FWD of the MMC configured by converter cell 43 in the half-bridge configuration with a thyristor. Controller 14 performs firing control of the thyristor only at the time of initial charging, and controls the thyristor to be fully conductive after completion of charging.

[Configuration Example of Controller]

Figure 6:
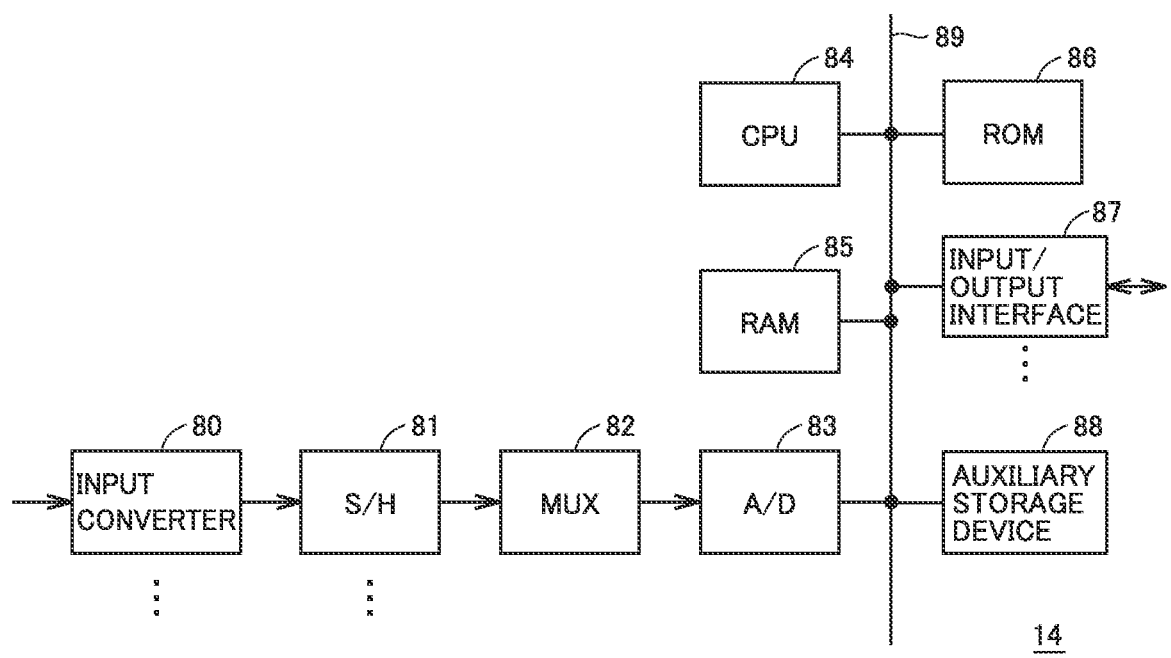
FIG. 6 is a block diagram illustrating an example of a hardware configuration of a controller of FIG. 1.

FIG. 6 is a block diagram illustrating the example of the hardware configuration of the controller of FIG. 1. FIG. 6 illustrates an example in which controller 14 is configured by a computer.

Referring to FIG. 6, controller 14 includes one or more input converters 80, one or more sample hold (S/H) circuits 81, a multiplexer (MUX) 82, and an analog to digital (A/D) converter 83. Controller 14 further includes one or more central processing units (CPUs) 84, a random access memory (RAM) 85, and a read only memory (ROM) 86. Further, controller 14 includes one or more input/output interfaces 87 and an auxiliary storage device 88. Controller 14 further includes a bus 89 that interconnects the above-described components.

Input converter 80 has an auxiliary transformer (not shown) for each input channel. Each auxiliary transformer converts a signal detected by each current transformer, each voltage transformer, or the like in FIG. 3 into a signal of a voltage level suitable for subsequent signal processing.

Sample hold circuits 81 are respectively provided for input converters 80. Each of sample hold circuit 81 samples and holds a signal representing an amount of electricity received from corresponding input converter 80 at a specified sampling frequency.

Multiplexer 82 sequentially selects the signal held in one or more sample hold circuits 81. A/D converter 83 converts the signal selected by multiplexer 82 into a digital value. Note that by providing a plurality of A/D converters 83, A/D conversion may be executed in parallel for detection signals of a plurality of input channels.

Input/output interface 87 is an interface circuit for communication between CPU 84 and an external device. For example, detection values of voltage detector 23 and voltage detector 31 in FIG. 2 and voltage detector 57 in FIG. 4 are taken into CPU 84 via input/output interface 87.

CPU 84 controls the controller as a whole and executes arithmetic processing according to a program. For example, CPU 84 controls the operation of AC/DC converter 12A based on detection signals from the current transformers, the voltage transformers, and the like in FIG. 3. Further, CPU 84 controls the operation of power storage apparatus 13, that is, an opening and closing operation of switching elements 20$p$ and 20$n$, based on the detection values of voltage detector 23 and voltage detector 31 in FIG. 2 and voltage detector 57 in FIG. 4.

RAM 85 as a volatile memory and ROM 86 as a nonvolatile memory are used as main storage of CPU 84. ROM 86 stores a program, setting values for signal processing, and the like. Auxiliary storage device 88 is a nonvolatile memory having a larger capacity than ROM 86, and stores a program, data of detection values of the electricity amounts, and the like. The program may be provided as a non-transitory storage medium or may be provided via the network.

Unlike the example of FIG. 6, at least a part of controller 14 can be configured using a circuit such as a field programmable gate array (FPGA) and an application specific integrated circuit (ASIC). That is, functions of the functional blocks illustrated in FIG. 3 can be configured on the basis of the computer illustrated in FIG. 6, or at least a part thereof can be configured using a circuit such as a FPGA and an ASIC. In addition, at least a part of the functions of the functional blocks can be configured by an analog circuit.

[Control Procedure of Power Storage Apparatus]

Next, control procedure of power storage apparatus 13 will be described. Hereinafter, a case where power storage apparatus 13 includes a capacitor (including an electric double layer) will be described.

FIG. 7 is a diagram showing a relationship between a charge amount and a DC voltage of a power storage apparatus including a capacitor. The amount of charge is equal to the product of the charging current and time. FIG. 7(A) shows characteristics of DC voltages V1 and V2 of individual booster cells BSM and characteristics of DC voltage Vb of storage bank ESB. The number n of booster cells BSMs is assumed to be 2. It is assumed that a storage capacity of booster cell BSM1 is smaller than a storage capacity of booster cell BSM2. FIG. 7(B) shows a relationship between the charge amount in entire power storage apparatus 13 and DC voltage Vdc.

Referring to FIG. 7(A), a DC voltage V and a charge amount Q have a relationship of V=Q/C using an electrostatic capacity C, and therefore show a relationship of a straight line passing through the origin. Therefore, in the case of AC/DC converter 12A of type 1 or in the case where initial charging device 60 is used in combination with AC/DC converter 12A of type 2, storage bank ESB and booster cell BSM can be charged with a constant current, and therefore a DC voltage Vd of storage bank ESB and DC voltages V1 and V2 of booster cell BSM increase at a constant speed.

In FIG. 7(A), an operating range (from a voltage d2 to a voltage d1) of the converter is determined such that the charge current charged to and the discharge current discharged from storage bank ESB fall within a certain range. Therefore, an energy use range only with storage bank ESB is a range from a charge amount q2 to a charge amount q1. Charge amount q1 corresponds to SOC=100%.

On the other hand, when AC/DC converter 12A of type 2 is used but initial charging device 60 is not used in combination, the DC voltage increases according to a time constant determined by a suppression resistor or the like in power storage apparatus 13. Therefore, the following description is applicable to a case after AC/DC converter 12A of type 2 is charged to its lower limit voltage.

When power storage apparatus 13 is constituted by a storage battery, the relationship between the charge amount and the DC voltage is not a straight line passing through the origin. In this case, if a characteristic curve of the storage battery is linearized around the rated voltage, it can be handled similarly to the case of the capacitor of type 1.

Figure 8:
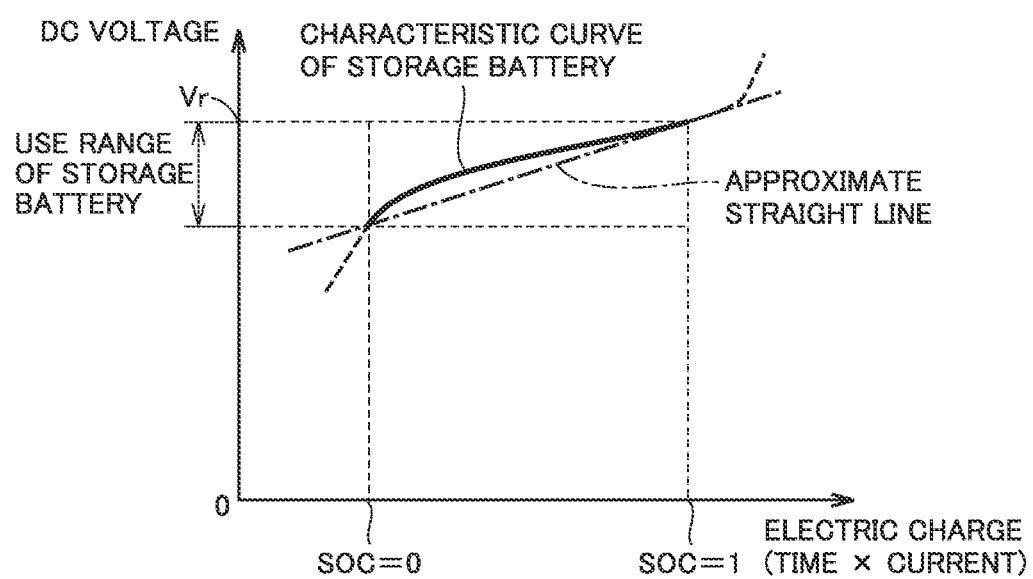
FIG. 8 is a diagram conceptually illustrating a characteristic curve of a storage battery.

FIG. 8 is a diagram conceptually illustrating the characteristic curve of the storage battery. As illustrated in FIG. 8, a characteristic curve indicating the relationship between the charge amount of the storage battery and the DC voltage is a curve that does not pass through the origin. Therefore, the following description can be applied by using an approximate straight line linearized near a rated voltage Vr of the storage battery.

Hereinafter, with reference to FIG. 7(B) and a flowchart of FIG. 9, charging procedure of power storage apparatus 13 will be described.

Figure 9:
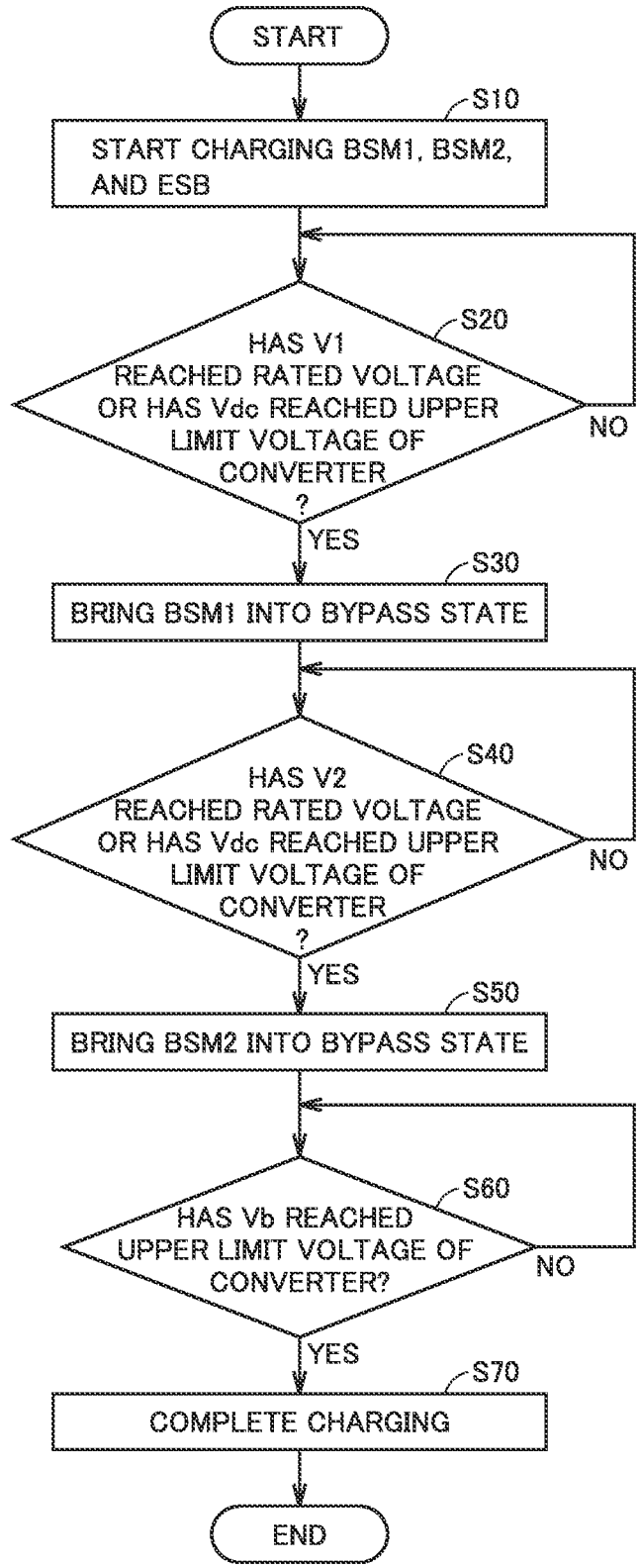
FIG. 9 is a flowchart showing a charging procedure of the power storage apparatus according to a first embodiment.

FIG. 9 is the flowchart showing the charging procedure of the power storage apparatus according to a first embodiment. In the initial state, it is assumed that the charge amount of storage bank ESB is 0 (that is, SOC=0%), and the charge amount of each booster cell BSM is also 0.

In step S10 of FIG. 9, controller 14 (specifically, CPU 84) turns on switching element 20p and turns off switching element 20n of each of booster cells BSM1 and BSM2 to cause AC/DC converter 12A to start charging booster cells BSM1 and BSM2 and storage bank ESB.

When storage bank ESB and each booster cell BSM are charged by passing the same current therethrough, booster cell BSM having a smaller storage capacity reaches the rated voltage earlier than storage bank ESB. When there is a plurality of booster cells BSM, the rated voltage is sequentially reached in ascending order of the storage capacity. Therefore, when DC voltage V1 of storage bank ESB1 having the smallest power storage capacity reaches the rated voltage (YES in step S20), controller 14 brings booster cell BSM1 into the bypass state (step S30). That is, controller 14 turns off switching element 20p and turns on switching element 20n of booster cell BSM1. Even when voltage Vdc (=V1+V2+Vb) of power storage apparatus 13 reaches upper limit voltage d1 of AC/DC converter 12A before voltage V1 of booster cell BSM1 reaches the rated voltage (YES in step S20), controller 14 brings booster cell BSM1 into the bypass state (step S30).

Thereafter, charging of booster cell BSM2 and storage bank ESB continues. When the DC voltage V2 of storage bank ESB2 having the next smallest power storage capacity reaches the rated voltage (YES in step S40), controller 14 brings booster cell BSM2 into the bypass state (step S50). Alternatively, when voltage Vdc (=V2+Vb) of power storage apparatus 13 reaches upper limit voltage d1 of AC/DC converter 12A before DC voltage V2 of booster cell BSM2 reaches the rated voltage (YES in step S40), controller 14 brings booster cell BSM2 into the bypass state (step S50).

Thereafter, charging of storage bank ESB continues. When DC voltage Vb of storage bank ESB reaches the rated voltage (that is, the upper limit voltage of AC/DC converter 12A) (YES in step S60), controller 14 stops charging of storage bank ESB (step S70).

Next, with reference to FIG. 7(B) and a flowchart of FIG. 10, discharging procedure of power storage apparatus 13 will be described.

Figure 10:
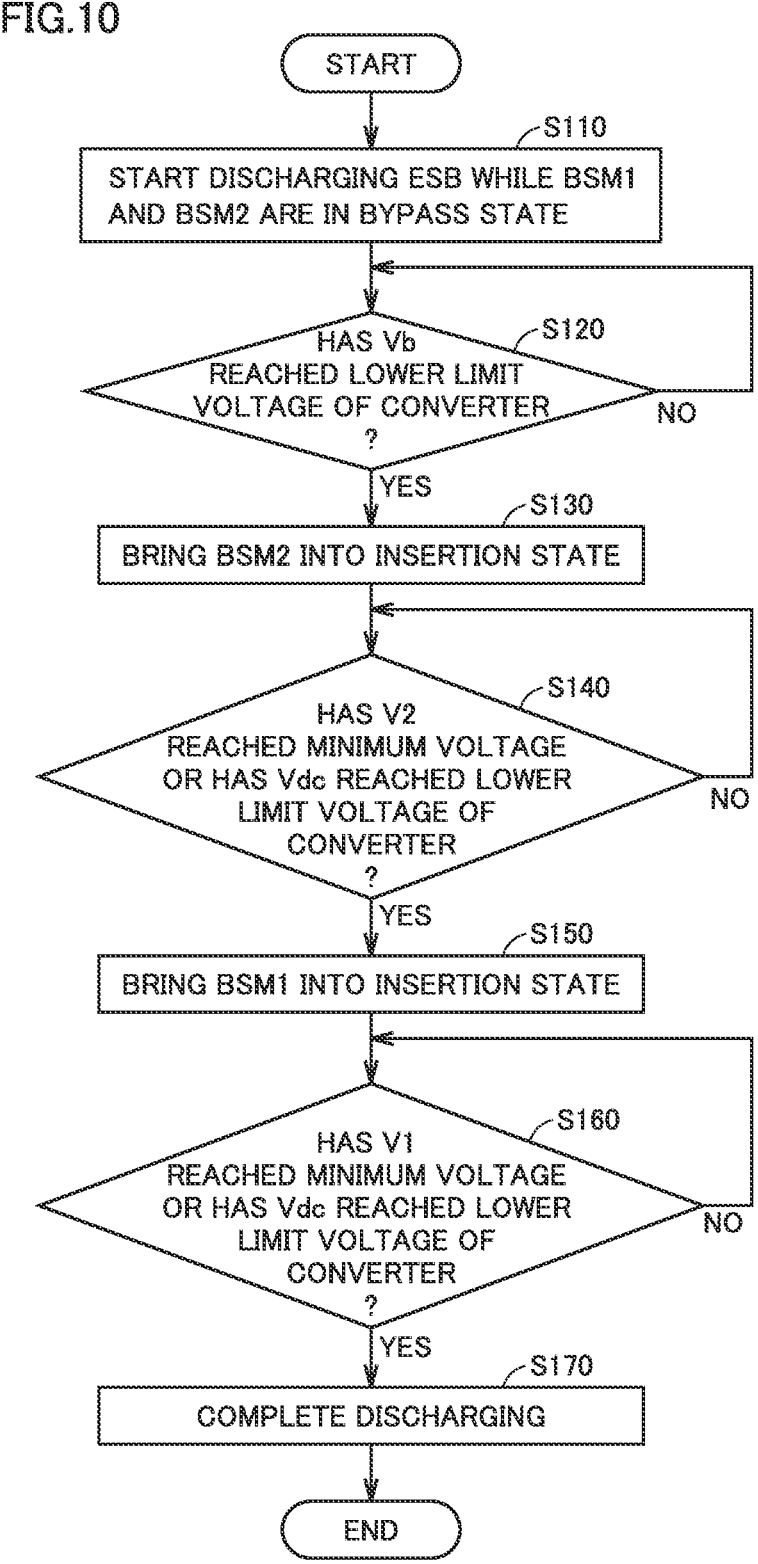
FIG. 10 is a flowchart showing a discharging procedure of the power storage apparatus according to the first embodiment.

FIG. 10 is the flowchart showing the discharging procedure of the power storage apparatus according to the first embodiment. It is assumed that on the initial state, the charge amount (SOC) of storage bank ESB is 100%, and the charge amount of each booster cell BSM is also 100%.

In step S110 of FIG. 10, controller 14 (specifically, CPU 84) brings both booster cells BSM1 and BSM2 into the bypass state, and starts discharging storage bank ESB by operating AC/DC converter 12A as an inverse conversion device.

When DC voltage Vb of storage bank ESB decreases to lower limit voltage d2 of AC/DC converter 12A (YES in step S120), controller 14 brings booster cell BSM2 into the insertion state (step S130). That is, controller 14 turns off switching element and turns on switching element 20p of booster cell BSM2.

Thereafter, discharging of storage bank ESB and booster cell BSM2 continues. When DC voltage V2 of booster cell BSM2 reaches a minimum usable voltage or when voltage Vdc (=V2+Vb) of power storage apparatus 13 decreases to lower limit voltage d2 of AC/DC converter 12A (YES in step S140), controller 14 brings booster cell BSM1 into the insertion state (step S150).

The minimum usable voltage varies depending on the type of power storage element 22. For example, when power storage element 22 is a storage battery, the minimum voltage is about 0.7 PU, and when power storage element 22 is a supercapacitor, the minimum voltage is about 0.3 PU.

Thereafter, discharging of storage bank ESB and booster cells BSM1 and BSM2 continues. When DC voltage V1 of booster cell BSM1 reaches the minimum usable voltage or when voltage Vdc (=V1+V2+Vb) of power storage apparatus 13 decreases to lower limit voltage d2 of AC/DC converter 12A (YES in step S160), controller 14 completes the discharge of power storage apparatus 13 (step S170).

In the case of AC/DC converter 12A of type 1, the discharge of power storage apparatus 13 can be further continued until DC voltage Vdc of power storage apparatus 13 becomes 0V. In the case of AC/DC converter 12A of type 2, the discharge of power storage apparatus 13 can be further continued until DC voltage Vdc of power storage apparatus 13 reaches an adjustable lower limit voltage of AC/DC converter 12A.

When FIG. 7(A) is compared with FIG. 7(B), in power storage apparatus 13 according to the first embodiment, it is possible to expand the energy use range of power storage apparatus 13 while suppressing the variation range of the DC voltage as compared with the case of storage bank ESB alone. Specifically, in the case of FIG. 7, the energy use range is expanded from charge amounts q1-q2 to charge amounts q1-q4.

[Example of Usage of Power System Stabilization System 8A]

Hereinafter, a method of using power system stabilization system 8A for AC power system 10A will be supplemented.

In a case where a target power system to which power system stabilization system 8A of the present embodiment is connected receives power interchange from another region, the frequency may decrease if the power interchange is interrupted. In this case, power system stabilization system 8A causes both storage bank ESB and each booster cell BSM to stand by in a fully charged state for frequency stabilization (hereinafter, referred to as a first standby mode). The power system stabilization system 8A performs the discharging operation of power storage apparatus 13 when the frequency decreases due to the interruption of the power interchange.

Conversely, when power is supplied from the target power system to another area in the present embodiment, the frequency of the target power system may rise after the power supply is cut off. In this case, power system stabilization system 8A causes both storage bank ESB and each booster cell BSM to stand by in a minimally charged state for frequency stabilization (hereinafter, referred to as a second standby mode). The power system stabilization system 8A performs the charging operation of power storage apparatus 13 when the frequency increases due to the interruption of the power supply.

In addition, when the target power system receives power interchange from another region and supplies power to another region, and there is a possibility of both a frequency decrease and a frequency increase, power system stabilization system 8A causes storage bank ESB and each booster cell BSM to stand by in an intermediate charge state for frequency stabilization.

Effects of First Embodiment

Hereinafter, first, problems of the conventional technique will be described, and next, it will be described that these problems are overcome with power storage apparatus 13 of the first embodiment.

Storage bank ESB of power storage apparatus 13 has a problem in that DC voltage Vb varies according to the energy storage amount (that is, SOC) of storage bank ESB. Therefore, when storage bank ESB is directly connected to AC/DC converter 12A, AC/DC converter 12A needs to be operable even in a state where SOC of storage bank ESB decreases (that is, the state in which DC voltage Vb is decreased). Therefore, it is necessary to provide AC/DC converter 12A as an MMC having the full-bridge configuration or to add a DC/DC converter, which increases the cost of the power system stabilization system.

In addition, when DC voltage Vb of storage bank ESB decreases, the power input to storage bank ESB or the power output from storage bank ESB decreases unless a larger DC current is caused to flow. Therefore, it is necessary to increase the rated current and the rated voltage of the semiconductor switching element and the capacitor constituting AC/DC converter 12A, which increases the cost as well as an installation space for AC/DC converter 12A.

For example, when DC voltage Vb of storage bank ESB changes between 0.5 and 1 PU due to charging and discharging, in a case where the input/output power is maintained from 1 PU, it is necessary to change the current between 1 and 2 PU. If the variation range of DC voltage Vb of storage bank ESB is suppressed between 0.8 and 1 PU, the variation amount of the current can be suppressed between 1 and 1.25 PU. However, since the energy utilization rate of storage bank ESB decreases, it is necessary to increase the number and size of the power storage elements 30 constituting storage bank ESB.

When power storage apparatus 13 is used for stabilizing the frequency of the power system, it is necessary to release the energy from power storage apparatus 13 to the power system or absorb the energy from the power system to power storage apparatus 13, before the frequency stabilization control of the generator such as the governor control responds after about 10 seconds from the occurrence of the accident. In this case, it is desirable that power storage apparatus 13 release or absorb the maximum amount of energy immediately after the occurrence of the accident, and thereafter, the energy release amount or the absorption amount is gradually reduced to around 0, so that the frequency stabilization control of the generator is performed without shock. In a case where power storage apparatus 13 is on standby in the full charge state, the change in the energy release amount described above can be realized naturally, but conversely, in a case where power storage apparatus 13 is on standby in the minimally charged state or the intermediate charge state, it is necessary to improve the current rating.

In power storage apparatus 13 of this embodiment, booster cell BSM is provided in series with storage bank ESB. As a result, it is possible to expand the energy utilization rate of storage bank ESB while suppressing a variation range of voltage Vdc of entire power storage apparatus 13. Furthermore, a sufficient charge current and discharge current can be secured even immediately after occurrence of an accident. In addition, by suppressing the variation range of voltage Vdc of power storage apparatus 13, an inexpensive MMC having the half-bridge configuration can be used as AC/DC converter 12A.

Second Embodiment

In a second embodiment, a method for further expanding the energy use range of power storage apparatus 13 by appropriately selecting the storage capacity and the electrostatic capacity of power storage element 22 of booster cell BSM will be described.

FIG. 11 is a view showing a relationship between an amount of electric charge and the DC voltage in the power storage apparatus according to the second embodiment. FIG. 11(A) shows characteristics of DC voltages V1 and V2 of the individual booster cells BSM and characteristics of DC voltage Vb of storage bank ESB. The number n of booster cells BSMs is assumed to be 2. FIG. 11(B) shows a relationship between the charge amount in entire power storage apparatus 13 and DC voltage Vdc.

In the second embodiment, the storage capacity of booster cell BSM1 is set to be smaller than the storage capacity of booster cell BSM2. Further, the voltage value of each booster cell BSM when each booster cell BSM is fully charged is set equal to the operating range (d1-d2) of the converter. Further, when AC/DC converter 12A of type 1 is used and the minimum use voltage is set for storage bank ESB, the voltage value of each booster cell BSM when fully charged is made equal to a difference between the voltage of storage bank ESB when fully charged and the minimum use voltage.

In the present disclosure, voltage values being "equal" means "substantially equal", and it is not necessary that the voltage values completely coincide with each other. For example, when the actual voltage value is within a range of ±5% of the ideal target value, the energy use range of power storage apparatus 13 can be sufficiently expanded. In addition, even when the actual voltage value is within a range of ±10% of the ideal target value, the energy use range of power storage apparatus 13 can be expanded to some extent.

When power storage element 22 of each booster cell BSM is a capacitor, the voltage can be set by adjusting the electrostatic capacity. As illustrated in FIG. 11(A), slopes of the characteristic straight lines are different between booster cell BSM1 and booster cell BSM2 by making the electrostatic capacity different. In addition, as illustrated in FIG. 11(B), the amounts of voltage variation when each booster cell BSM is brought into the bypass state or the insertion state are all equal. Accordingly, the energy use range (q1-q6) of power storage apparatus 13 can be further expanded.

The same applies to a case where the number n of booster cells BSMs is equal to or more than three. Specifically, by making the storage capacities of the n booster cells BSM different from each other, control is performed such that the bypass state is set in ascending order of the storage capacities at the time of charging. Further, the voltage of each booster cell BSM when fully charged is made equal to a difference between a minimum voltage and a maximum voltage of storage bank ESB when power storage apparatus 13 is used. Accordingly, the energy use range of power storage apparatus 13 can be further expanded.

Third Embodiment

In a third embodiment, a case where switching elements 20p and 20n of booster cell BSM perform a chopper operation will be described. Although the switching loss increases, direct current voltage Vdc of power storage apparatus 13 can be kept substantially constant. In addition, in a case where AC/DC converter 12A is configured by MMC, since a reactor is included in each arm, there is only a low possibility that the current is suddenly changed by the chopper operation. Hereinafter, a state in which switching elements 20p and 20n of booster cell BSM perform the chopper operation is referred to as a chopper state.

Figure 12:
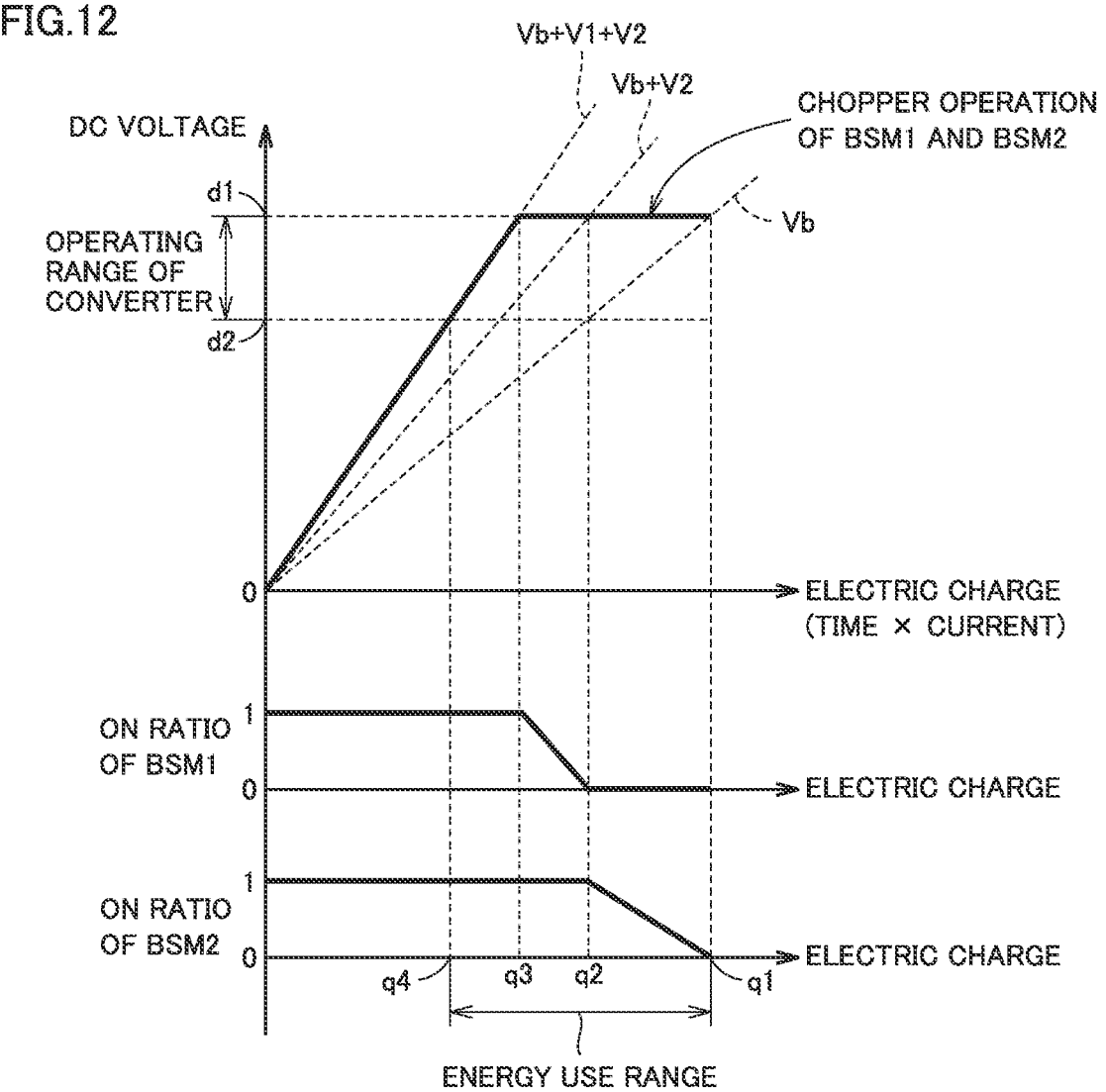
FIG. 12 is a view showing a relationship between an amount of electric charge and a DC voltage in the power storage apparatus according to a third embodiment.

FIG. 12 is a view showing a relationship between an amount of electric charge and the DC voltage in the power storage apparatus according to the third embodiment. Characteristics of voltages and charges shown in FIG. 12 correspond to FIG. 7(B).

FIG. 12 further illustrates an ON ratio of booster cell BSM1 and an ON ratio of booster cell BSM2. In the present disclosure, a time period during which switching element 20p is controlled to be on and switching element 20n is controlled to be off is referred to as ON time, and a time period during which switching element 20p is controlled to be off and switching element 20n is controlled to be on is referred to as OFF time. In this case, the ON ratio is a ratio of the ON time to a sum of the ON time and the OFF time. The chopper control may be pulse width control, pulse frequency control, or other pulse control.

Referring to FIG. 12, the method of controlling power storage apparatus 13 in which the charge amount is from 0 to q3 is the same as that in FIG. 7(B). That is, controller 14 controls both booster cells BSM1 and BSM2 to be in the insertion state.

In the range from charge amount q3 to q2, controller 14 controls booster cell BSM2 to be in the insertion state and booster cell BSM1 to be in the chopper state. With this, voltage Vdc of power storage apparatus 13 is made equal to upper limit voltage d1 of AC/DC converter 12A. As the amount of charge accumulated in power storage apparatus 13 increases, the ON ratio of booster cell BSM1 decreases.

In the range from charge amount q2 to q1, controller 14 controls booster cell BSM1 to be in the bypass state and booster cell BSM2 to be in the chopper state. With this, voltage Vdc of power storage apparatus 13 is made equal to upper limit voltage d1 of AC/DC converter 12A. As the amount of charge accumulated in power storage apparatus 13 increases, the ON ratio of booster cell BSM2 decreases. Charging of power storage apparatus 13 is completed when the amount of electric charge accumulated in power storage apparatus 13 reaches q1. At this point, both booster cells BSM1 and BSM2 are in the bypass state.

Hereinafter, with reference to FIG. 12 and a flowchart of FIG. 13, charging procedure of power storage apparatus 13 of the third embodiment will be described.

Figure 13:
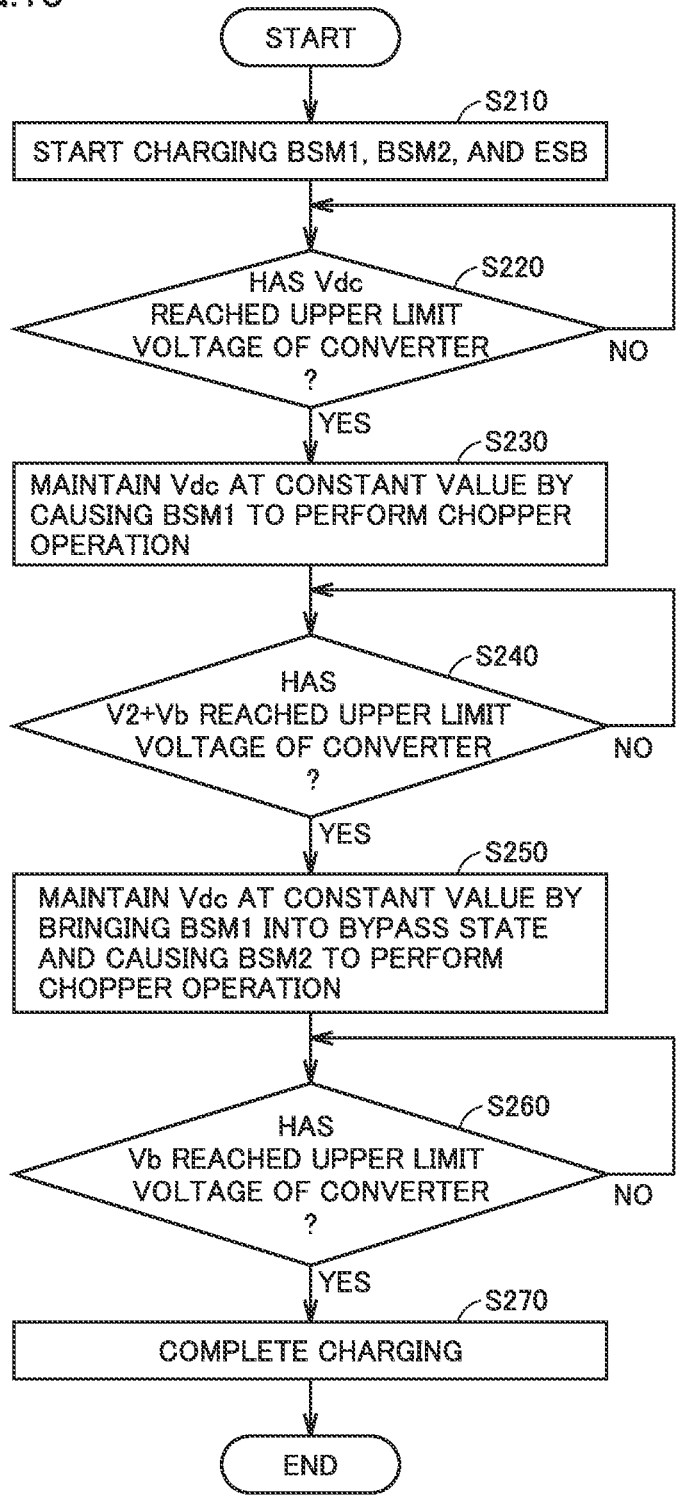
FIG. 13 is a flowchart showing a charging procedure of the power storage apparatus according to the third embodiment.

FIG. 13 is the flowchart showing charging procedure of the power storage apparatus according to the third embodiment. In the initial state, it is assumed that the charge amount of storage bank ESB is 0 (that is, SOC=0%), and the charge amount of each booster cell BSM is also 0.

In step S210 of FIG. 13, controller 14 (specifically, CPU 84) turns on switching element 20p and turns off switching element 20n of each of booster cells BSM1 and BSM2 to cause AC/DC converter 12A to start charging booster cells BSM1 and BSM2 and storage bank ESB.

When voltage Vdc (=V1+V2+Vb) of power storage apparatus 13 reaches upper limit voltage d1 (YES in step S220), controller 14 maintains voltage Vdc of power storage apparatus 13 at upper limit voltage d1 by switching booster cell BSM1 having the smallest storage capacity to the chopper control (step S230). In this state, booster cell BSM2 remains in the insertion state.

Thereafter, when the sum of DC voltage V2 of booster cell BSM and DC voltage Vb of storage bank ESB reaches upper limit voltage d1 of AC/DC converter 12A (YES in step S240), controller 14 brings booster cell BSM1 into the bypass state and switches booster cell BSM2 having the next smallest power storage capacity to the chopper control (step S250). Accordingly, controller 14 maintains voltage Vdc of power storage apparatus 13 at upper limit voltage d1.

Thereafter, when DC voltage Vb of storage bank ESB reaches upper limit voltage d1 of AC/DC converter 12A (YES in step S260), controller 14 switches booster cell BSM2 to the bypass state and stops charging storage bank ESB (step S270).

As described above, when power storage apparatus 13 is charged, controller 14 shifts each booster cell BSM from the insertion state to the bypass state via the chopper state.

Next, with reference to FIG. 12 and a flowchart of FIG. 14, discharging procedure of power storage apparatus 13 will be described.

Figure 14:
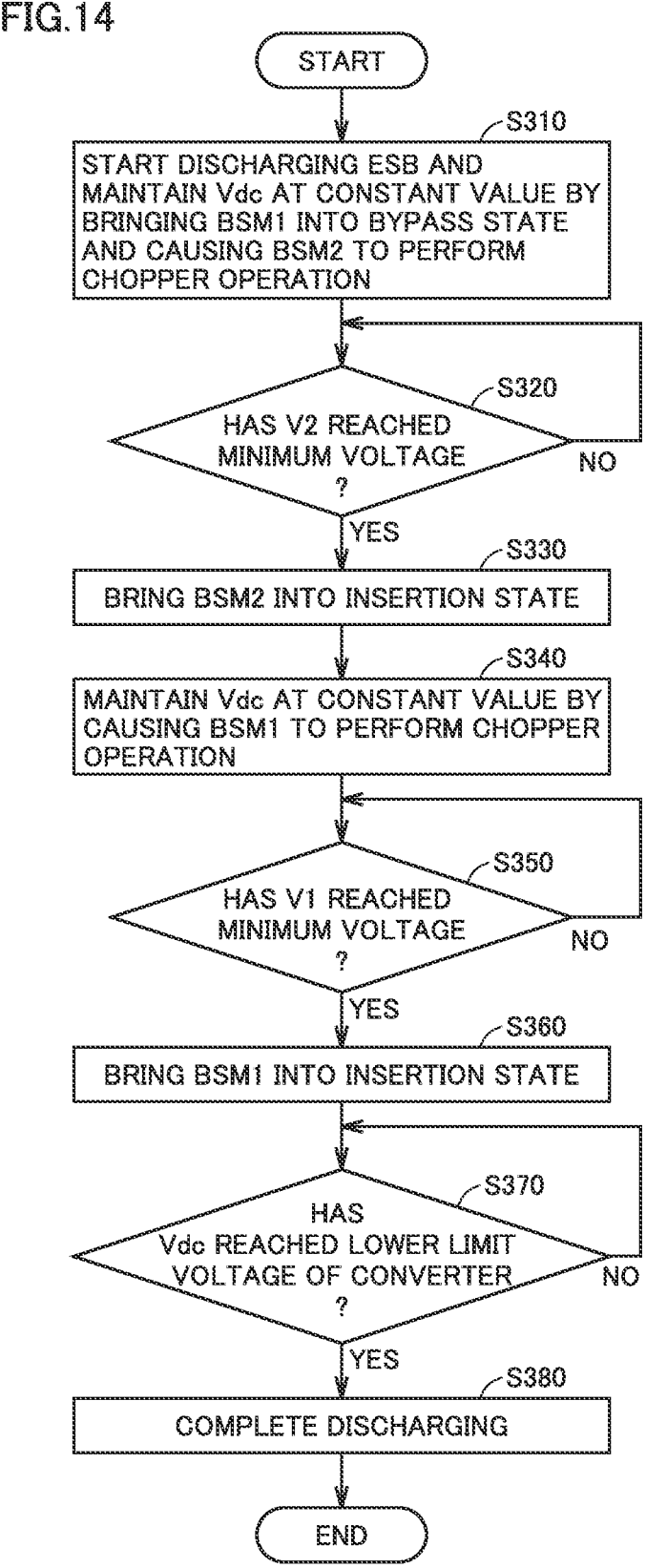
FIG. 14 is a flowchart showing a discharging procedure of the power storage apparatus according to the third embodiment.

FIG. 14 is the flowchart showing discharging procedure of the power storage apparatus according to the third embodiment. It is assumed that on the initial state, the charge amount (SOC) of storage bank ESB is 100%, and the charge amount of each booster cell BSM is also 100%.

In step S310 of FIG. 14, controller 14 (specifically, CPU 84) starts discharging storage bank ESB. Controller 14 further brings booster cell BSM1 into the bypass state and performs chopper control on booster cell BSM2 to keep voltage Vdc of power storage apparatus 13 at upper limit voltage d1 of AC/DC converter 12A.

When DC voltage V2 of booster cell BSM2 reaches the minimum usable voltage (YES in step S320), controller 14 ends the chopper operation of booster cell BSM2 and switches to the insertion state (step S330). Furthermore, controller 14 performs chopper control on booster cell BSM1 to maintain voltage Vdc of power storage apparatus 13 at upper limit voltage d1 of AC/DC converter 12A (step S340).

Thereafter, when DC voltage V1 of booster cell BSM1 reaches the minimum usable voltage (YES in step S350), controller 14 ends the chopper operation of booster cell BSM1 and switches to the insertion state (step S360).

Thereafter, when voltage Vdc (=V1+V2+Vb) of power storage apparatus 13 decreases to lower limit voltage d2 of AC/DC converter 12A (YES in step S370), controller 14 completes the discharge of power storage apparatus 13 (step S380).

As described above, when power storage apparatus 13 is discharged, controller 14 shifts each booster cell BSM from the bypass state to the insertion state via the chopper state. Accordingly, voltage Vdc of power storage apparatus 13 can be maintained within a certain range.

Fourth Embodiment

The following describes a case where the target power system to which power system stabilization system 8A is connected may have a frequency increase, and power storage apparatus 13 stands by in the minimally charged state. In this case, instead of submodule BSM including power storage element 22, a submodule ASM including a resistance element and a semiconductor bypass switch connected in parallel to the resistance element can be used. A plurality of submodules ASM each including the resistance element may be connected in series to storage bank ESB. In the present disclosure, the submodule ASM including the resistance element is also referred to as an absorber cell ASM or a second cell ASM.

When the frequency of the target power system increases, power system stabilization system 8A can absorb more energy by bringing the resistance element of absorber cell ASM into the insertion state and causing absorber cell ASM to dissipate excess energy. In this case, it should be noted that DC voltage Vdc increases by a voltage generated in the resistance element from the upper limit voltage of storage bank ESB. AC/DC converter 12A needs to be operable with respect to the upper limit voltage including the voltage increase by the resistance element. When power storage apparatus 13 is discharged, a bypass switch 90 is controlled to be turned on. Hereinafter, with reference to the drawings, a detailed description will be given.

Figure 15:
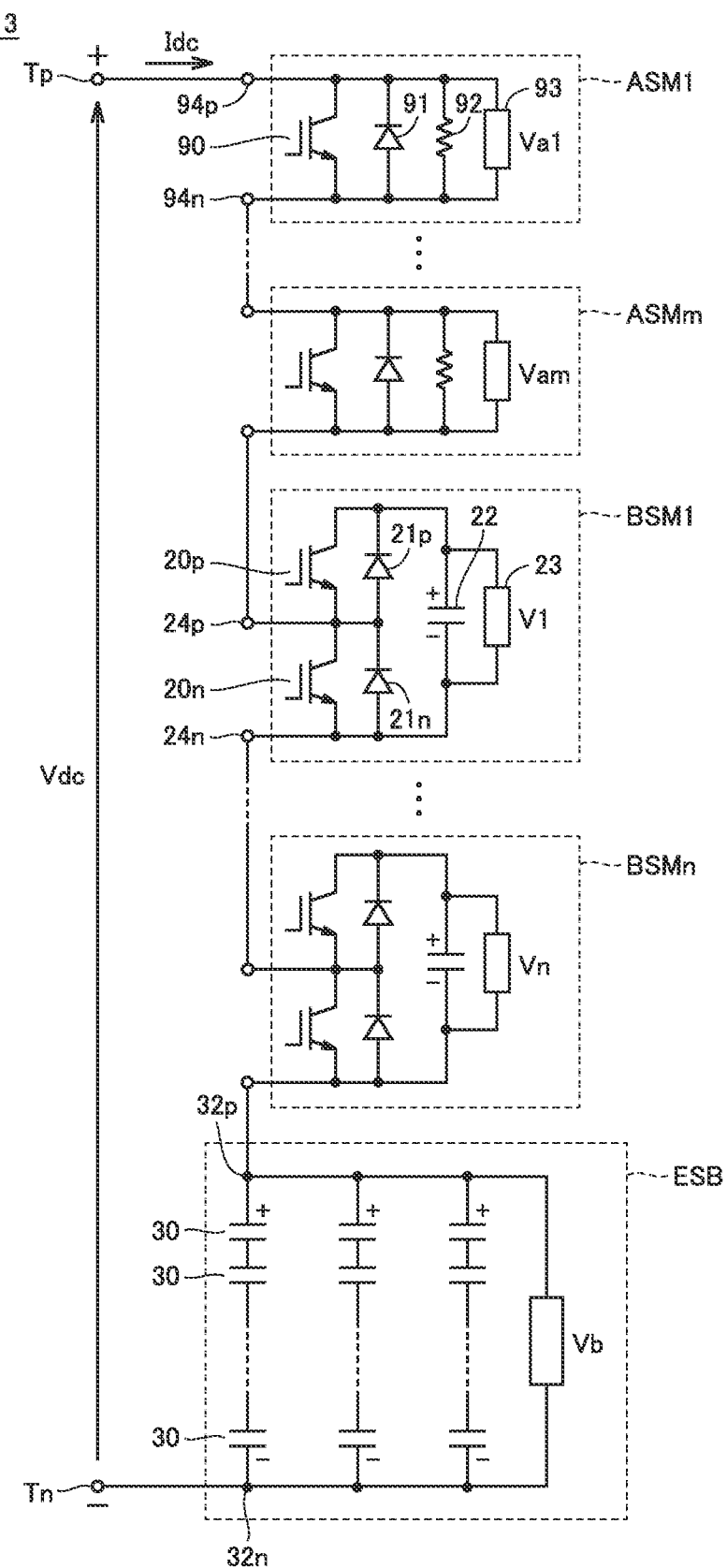
FIG. 15 is a circuit diagram illustrating a schematic configuration of the power storage apparatus according to a fourth embodiment.

FIG. 15 is a circuit diagram showing a schematic configuration of the power storage apparatus according to a fourth embodiment. Power storage apparatus 13 shown in FIG. 15 is different from power storage apparatus 13 shown in FIG. 2 in that further one or more (m) absorber cells ASM1 to ASMm each of which includes a resistance element 92 are provided. One or more absorber cells ASM1 to ASMm, storage bank ESB, and one or more booster cells BSM1 to BSMn are connected in series between positive electrode terminal Tp and negative electrode terminal Tn of power storage apparatus 13. These may be arranged in any order. Hereinafter, in a case where absorber cells ASM1 to ASMn are collectively referred to or one of them is referred to as an absorber cell ASM.

Each absorber cell ASM includes bypass switch 90 configured by a semiconductor element, a diode 91, resistance element 92, and a voltage detector 93 to detect a voltage Va (Va1 to Vam) generated in resistance element 92. These components are connected in parallel between input/output nodes 94$p$ and 94$n$. Diode 91 is connected in anti-parallel to bypass switch 90. Controller 14 controls opening and closing of bypass switch 90 and acquires a detection value of voltage detector 93. Each absorber cell ASM is connected, via input/output node 94$p$, to input/output node 94$n$ of adjacent absorber cell ASM, input/output node 24$n$ of adjacent booster cell BSM, negative electrode node 32$n$ of adjacent storage bank ESB, or positive electrode terminal Tp. Each absorber cell ASM is connected, via input/output node 94$n$, to input/output node 94$p$ of adjacent absorber cell ASM, input/output node 24$p$ of adjacent booster cell BSM, positive electrode node 32$p$ of adjacent storage bank ESB, or negative electrode terminal Tn.

Since other parts in FIG. 15 are similar to those in FIG. 2, the same or corresponding parts are denoted by the same reference numerals, and the description thereof will not be repeated.

Next, with reference to FIGS. 16 to 18, an operation of power storage apparatus 13 of the fourth embodiment will be described.

Figure 16:
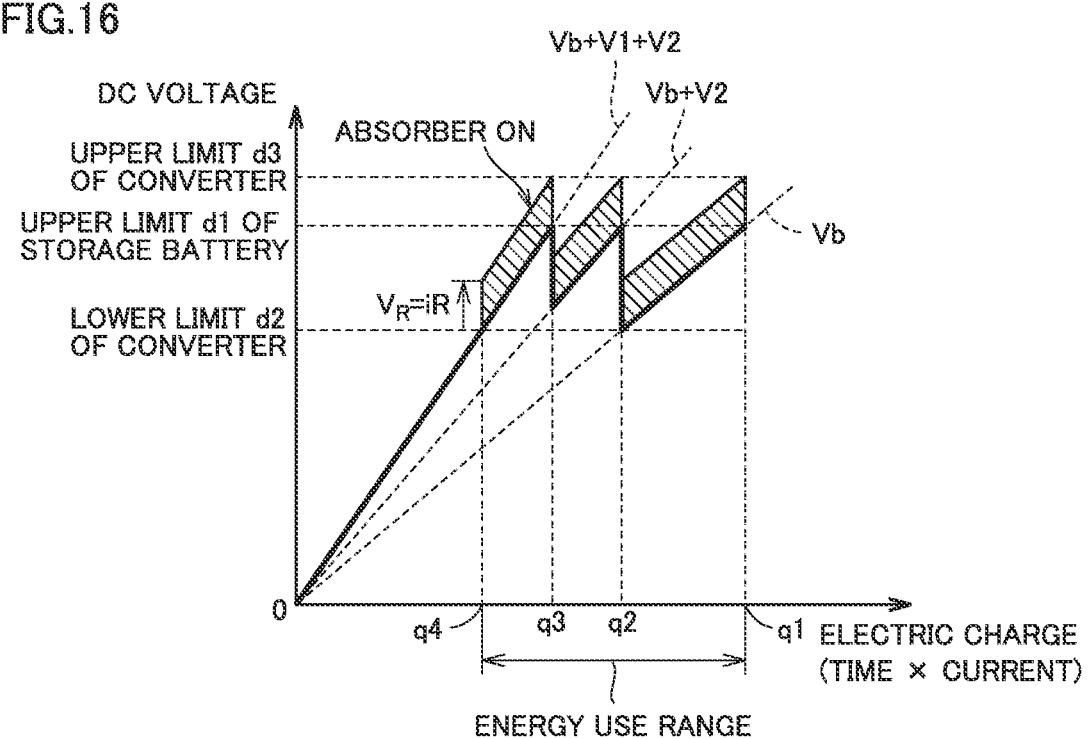
FIG. 16 is a view for illustrating a first operation example of the power storage apparatus according to the fourth embodiment.

FIG. 16 is a view for showing a first operation example of the power storage apparatus according to the fourth embodiment. FIG. 16 shows a relationship between the charge amount of power storage apparatus 13 and the DC voltage. The operation example of FIG. 16 corresponds to FIG. 7(B).

Referring to FIG. 16, the charging current is denoted by i, and the resistance value of resistance element 92 of all absorber cells ASM is denoted by R. When resistance element 92 is inserted between input/output nodes 94$p$ and 94$n$ by turning off bypass switch 90 (that is, when the absorber cell is turned on), a voltage $V_R$ (=i×R) generated in resistance element 92 is added to DC voltage Vdc in the case of FIG. 7(B). In addition to the energy charged in storage bank ESB, energy corresponding to additional voltage $V_R$ is further absorbed in power storage apparatus 13.

Figure 17:
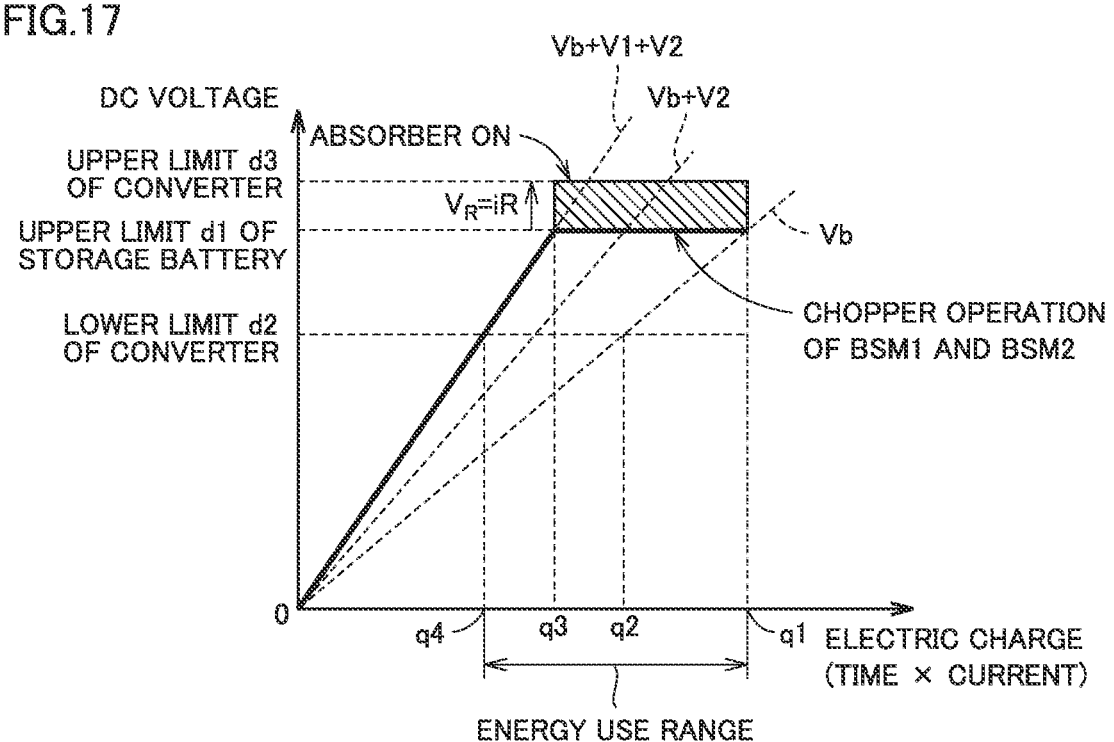
FIG. 17 is a view for illustrating a second operation example of the power storage apparatus according to the fourth embodiment.

FIG. 17 is a view for showing a second operation example of the power storage apparatus according to the fourth embodiment. FIG. 17 shows a relationship between the charge amount of power storage apparatus 13 and the DC voltage. The operation example of FIG. 17 corresponds to FIG. 12.

Referring to FIG. 17, booster cells BSM1 and BSM2 perform a chopper operation similarly to the case of FIG. 12. When resistance element 92 is inserted between input/output nodes 94p and 94n by turning off bypass switch 90 (that is, when the absorber cell is turned on), a voltage $V_R$ (=i×R) generated in resistance element 92 is added to DC voltage Vdc in the case of FIG. 12. In addition to the energy charged in storage bank ESB, energy corresponding to additional voltage $V_R$ is further absorbed in power storage apparatus 13.

Figure 18:
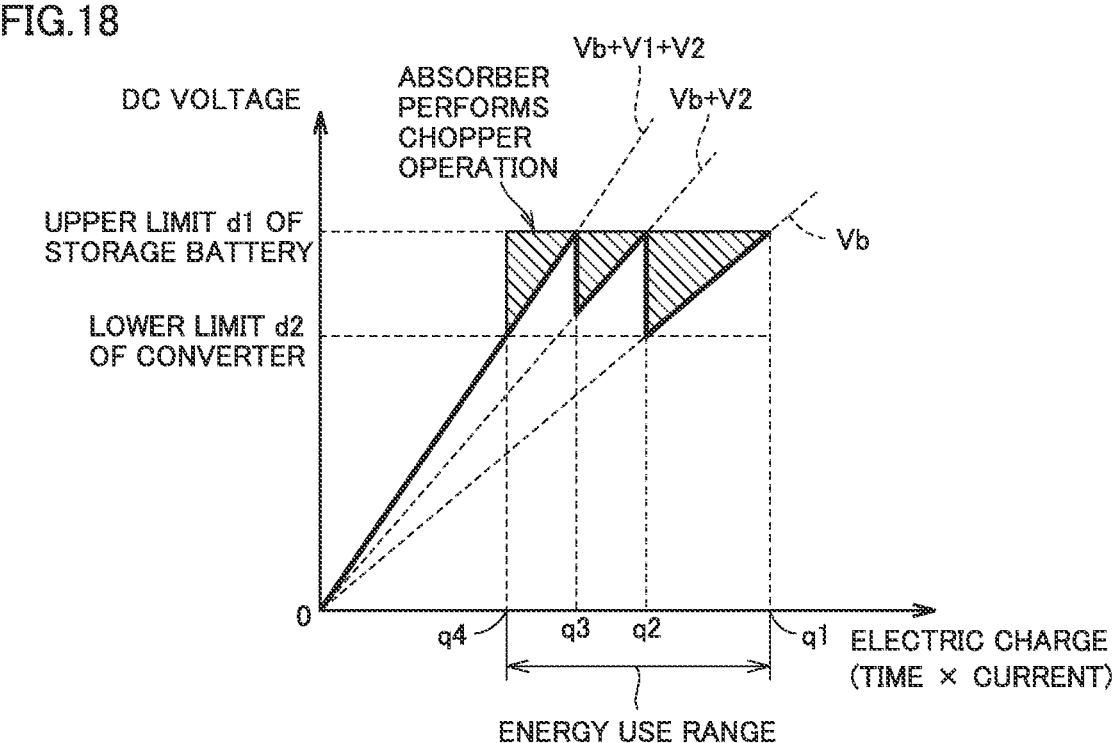
FIG. 18 is a view for illustrating a third operation example of the power storage apparatus according to the fourth embodiment.

FIG. 18 is a view for showing a third operation example of the power storage apparatus according to the fourth embodiment. FIG. 18 shows a relationship between the charge amount of power storage apparatus 13 and the DC voltage. The operation example of FIG. 18 corresponds to FIG. 7(B).

Referring to FIG. 18, controller 14 performs a chopper operation on bypass switch 90 of each absorber cell ASM to control the voltage obtained by adding additional voltage $V_R$ to DC voltage Vdc of power storage apparatus 13 in the case of FIG. 7(B) to be a constant value. Specifically, controller 14 adjusts a ratio of absorber cells ASM to be brought into the bypass state and a duty factor of resistance element 92 in absorber cell ASM to perform chopper control, in accordance with the detected values of DC voltages V1 and V2 of booster cell BSM and DC voltage Vb of storage bank ESB. Accordingly, upper limit voltage d1 of power storage apparatus 13 can be suppressed.

Fifth Embodiment

In a fifth embodiment, specific structures and arrangements of booster cell BSM and storage bank ESB constituting power storage apparatus 13 will be described.

Figure 19:
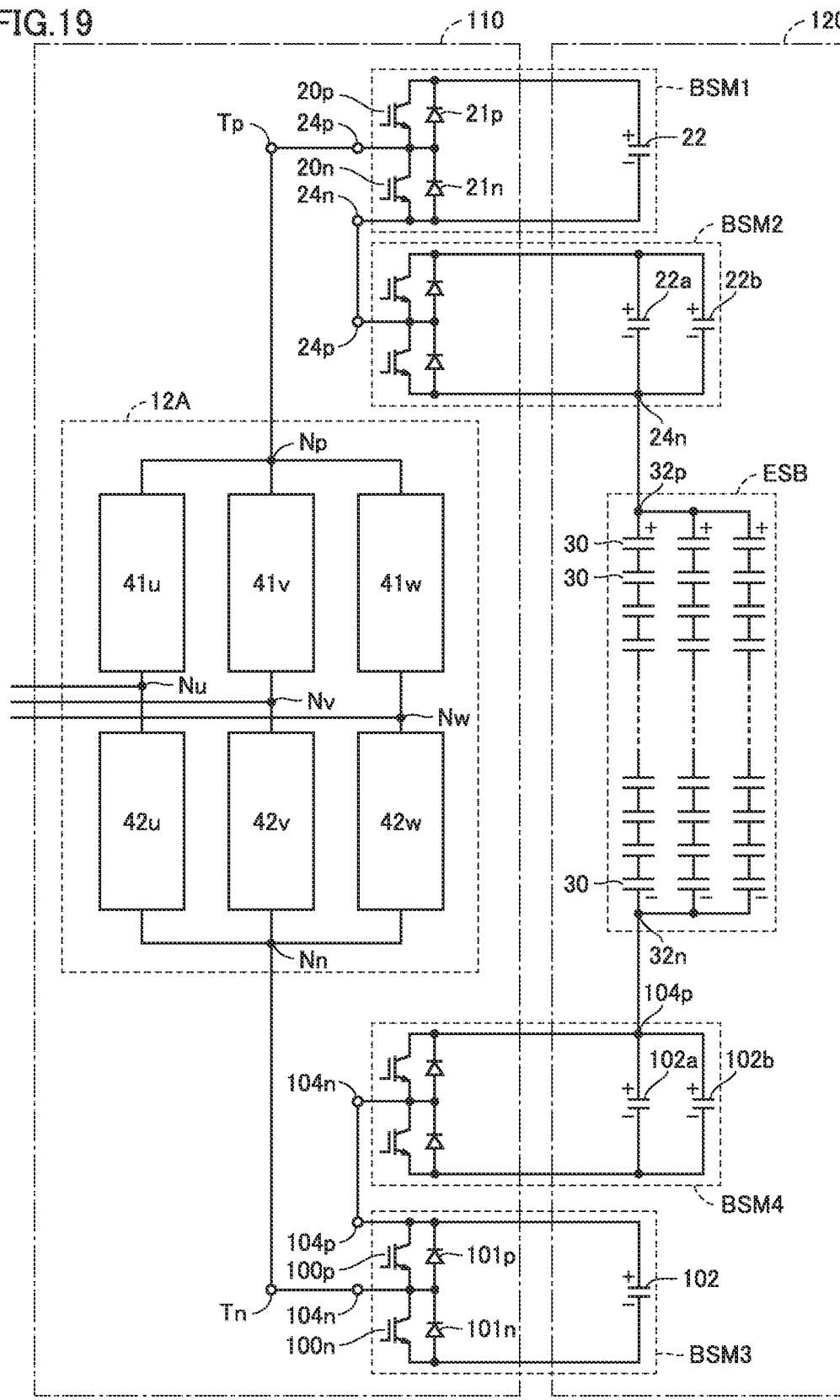
FIG. 19 is a circuit diagram for illustrating a specific arrangement of an AC/DC converter, a booster cell, and a storage bank constituting the power system stabilization system.

FIG. 19 is a circuit diagram for illustrating a specific arrangement of the AC/DC converter, the booster cell, and the storage bank constituting the power system stabilization system.

Referring to FIG. 19, booster cell BSM1, booster cell BSM2, storage bank ESB, booster cell BSM4, and booster cell BSM3 are arranged in series in this order between positive electrode terminal Tp and negative electrode terminal Tn. Further, positive electrode terminal Tp is connected to high-potential-side DC terminal Np of AC/DC converter 12A, and negative electrode terminal Tn is connected to low-potential-side DC terminal Nn of AC/DC converter 12A.

Note that, in AC/DC converter 12A of FIG. 19, only a U-phase upper arm 41u, a V-phase upper arm 41v, a W-phase upper arm 41w, a U-phase lower arm 42u, a V-phase lower arm 42v, and a W-phase lower arm 42w are illustrated in a simplified manner.

Here, a portion of bridge circuit 25 of each booster cell BSM and AC/DC converter 12A are housed in a common rack 110, and power storage element 22 of each booster cell BSM and storage bank ESB are housed in a common rack 120.

FIG. 20 illustrates a side view and a plan view illustrating an implementation example corresponding to the circuit diagram of FIG. 19. FIG. 20(A) shows a side view, and FIG. 20(B) shows a plan view.

Referring to FIG. 20, rack 110 has a structure in which a plurality of stages 115 is stacked. Each stage 115 is supported on an installation surface 130 by struts 114 penetrating the insulators attached to the four corners of an insulating substrate 111. An insulating shield 112 is attached to an outer periphery of insulating substrate 111 so as to surround insulating substrate 111. The portion of bridge circuit 25 of each booster cell BSM and each converter cell 43 of AC/DC converter 12A are disposed on insulating substrate 111.

Similarly, rack 120 has a structure in which a plurality of stages 125 is stacked. Each stage 125 is supported on installation surface 130 by struts 124 penetrating the insulators attached to the four corners of an insulating substrate 121. An insulating shield 122 is attached to an outer periphery of insulating substrate 121 so as to surround insulating substrate 121. Power storage element 22 of each booster cell BSM and power storage element 30 of storage bank ESB are disposed on insulating substrate 121.

As described above, the portion of bridge circuit 25 of each booster cell BSM is positioned in proximity to converter cell 43 on the rack common to AC/DC converter 12A. Power storage element 22 of each booster cell BSM is disposed in proximity to power storage element 30 in the rack common to storage bank ESB. With such an arrangement, the insulating and supporting structure can be simplified.

The above arrangement is particularly effective when the rated voltage of switching elements 20p and 20n of each booster cell BSM is different from the rated voltage of power storage element 22. For example, using booster cell BSM having the full-bridge configuration is effective for an operation with DC voltage Vdc of AC/DC converter 12A being lower than DC voltage Vb of storage bank ESB.

When absorber cell ASM (absorber cell) described in the fourth embodiment is provided in power storage apparatus 13, bypass switch 90 and diode 91 constituting absorber cell ASM are housed in rack 110, and resistance element 92 is housed in rack 120.

The embodiments disclosed herein should be considered to be illustrative in all respects and not restrictive. The scope of the present application is defined by the claims, instead of the descriptions stated above, and it is intended that all modifications that come within the meaning and range of equivalence to the claims are included here. The above embodiments can be combined with each other.

REFERENCE SIGNS LIST 8A, 8B: power system stabilization system, 10A: AC power system, 10B: DC power system, 11: transformer, 12A: AC/DC converter, 12B: DC/DC converter, 13: power storage apparatus, 14: controller, 20, 55: switching element, 21, 70: diode, 22, 30, 56: power storage element, 23, 31, 57, 93: voltage detector, 24n, 24p, 58n, 58p, 94n, 94p: input/output node, 25: bridge circuit, 32n: negative electrode node, 32p: positive electrode node, 40, 40u, 40v, 40w: leg circuit, 41: upper arm, 42: lower arm, 43: converter cell, 60: initial charging device, 61: switch, 92: resistance element, 90: bypass switch, 84: CPU 110, 120: rack, 111, 121: insulating substrate, 112, 122: insulating shield, 114, 124: strut, 115, 125: stage, ASM: submodule (absorber cell), BSM: submodule (booster cell), ESB: storage bank, Nn: low-potential-side DC terminal, Np: high-potential-side DC terminal, Nu, Nv, Nw: AC input terminal, Tn: negative electrode terminal, Tp: positive electrode terminal

The invention claimed is:

1. A power storage apparatus comprising:
a positive electrode terminal on a high potential side;
a negative electrode terminal on a low potential side;
a storage bank including a plurality of power storage elements connected to each other; and
a plurality of first cells, wherein
the storage bank and the plurality of first cells are connected in series between the positive electrode terminal and the negative electrode terminal,
each of the plurality of first cells includes:
a pair of input/output nodes;
a bridge circuit including at least two semiconductor switching elements; and
a power storage element connected to the pair of input/output nodes via the bridge circuit,
a storage capacity of the power storage element of each of the plurality of first cells is smaller than a storage capacity of the storage bank, and
storage capacities of the plurality of first cells are different from each other.

2. The power storage apparatus according to claim 1, wherein voltages of the power storage elements of the plurality of first cells fully charged are equal to each other.

3. The power storage apparatus according to claim 1, further comprising a controller to control each of the plurality of first cells,
wherein the controller switches each of the plurality of first cells to an insertion state in which the power storage element is inserted between the pair of input/output nodes, or to a bypass state in which the pair of input/output nodes is short-circuited.

4. The power storage apparatus according to claim 3, wherein, when the power storage apparatus is charged, the controller starts charging after switching the plurality of first cells to the insertion state, and switches the plurality of first cells to the bypass state in an ascending order from the first cell having a smallest storage capacity, among the plurality of first cells, according to a voltage of the power storage apparatus.

5. The power storage apparatus according to claim 3, wherein, when the power storage apparatus is discharged, the controller starts discharging after switching the plurality of first cells to the bypass state, and switches the plurality of first cells to the insertion state in order according to a voltage of the power storage apparatus.

6. The power storage apparatus according to claim 3, wherein, when each of the plurality of first cells is switched from the bypass state to the insertion state or vice versa, the controller interposes a chopper state in which the at least two semiconductor switching elements are made to perform a chopper operation so as to keep the voltage of the power storage apparatus within a certain range.

7. The power storage apparatus according to claim 3, wherein
the controller has a first standby mode used when the power storage apparatus is connected to a power system that receives power interchange from another region, and a second standby mode used when the power storage apparatus is connected to a power system that supplies power to another region,
the controller brings the storage bank and the plurality of first cells into a fully charged state in the first standby mode, and
the controller brings the storage bank and the plurality of first cells into a minimally charged state in the second standby mode.

8. The power storage apparatus according to claim 1, further comprising one or a plurality of second cells, wherein
the storage bank, the plurality of first cells, and the one or the plurality of second cells are connected in series to each other, and
the one second cell or each of the plurality of second cells includes:
a pair of input/output nodes;
a resistance element connected between the pair of input/output nodes; and
a semiconductor switching element to bypass the resistance element.

9. The power storage apparatus according to claim 8, further comprising a controller to control the plurality of first cells and the one or the plurality of second cells,
wherein the controller controls the semiconductor switching element of the one second cell or the semiconductor switching element of each of the plurality of second cells to an off state when the power storage apparatus is charged, and to an on state when the power storage apparatus is discharged.

10. A power system stabilization system, comprising:
a power storage apparatus; and
a power conversion device connected between a power system and the power storage apparatus,
the power storage apparatus comprising:
a positive electrode terminal connected to a high-potential-side DC terminal of the power conversion device;
a negative electrode terminal connected to a low-potential-side DC terminal of the power conversion device;
a storage bank including a plurality of power storage elements connected to each other; and
a plurality of first cells, wherein
the storage bank and the plurality of first cells are connected in series between the positive electrode terminal and the negative electrode terminal,
each of the plurality of first cells includes:
a pair of input/output nodes;
a bridge circuit including at least two semiconductor switching elements; and
a power storage element connected to the pair of input/output nodes via the bridge circuit,
a storage capacity of the power storage element of each of the plurality of first cells is smaller than a storage capacity of the storage bank, and
storage capacities of the plurality of first cells are different from each other.

11. The power system stabilization system according to claim 10, wherein
the bridge circuit included in each of the plurality of first cells is housed in a first rack together with the power conversion device, and
the power storage element included in each of the plurality of first cells is housed in a second rack different from the first rack together with the storage bank.

* * * * *